US012735517B2

(12) United States Patent
Kaharu et al.

(10) Patent No.: US 12,735,517 B2
(45) Date of Patent: Sep. 15, 2026

(54) AQUEOUS DISPERSION, AQUEOUS EMULSION, COATING AGENT, COATED PAPER, MULTILAYER STRUCTURE, PACKING MATERIAL, ADHESIVE AGENT, AND AQUEOUS EMULSION PRODUCTION METHOD

(71) Applicant: KURARAY CO., LTD., Okayama (JP)

(72) Inventors: Taeko Kaharu, Chiba (JP); Yoriko Imaoka, Okayama (JP); Yuta Taoka, Houston, TX (US); Ayumu Yamamoto, Okayama (JP)

(73) Assignee: KURARAY CO., LTD., Okayama (JP)

( * ) Notice: Subject to any disclaimer, the term of this patent is extended or adjusted under 35 U.S.C. 154(b) by 811 days.

(21) Appl. No.: 17/915,740

(22) PCT Filed: Mar. 26, 2021

(86) PCT No.: PCT/JP2021/013138
§ 371 (c)(1),
(2) Date: Sep. 29, 2022

(87) PCT Pub. No.: WO2021/200755
PCT Pub. Date: Oct. 7, 2021

(65) Prior Publication Data

US 2023/0118744 A1 Apr. 20, 2023

(30) Foreign Application Priority Data

Mar. 30, 2020 (JP) ................................ 2020-059697
Apr. 30, 2020 (JP) ................................ 2020-080410
Apr. 30, 2020 (JP) ................................ 2020-080414

(51) Int. Cl.

| | |
|---|---|
| ***C08F 216/06*** | (2006.01) |
| ***C08K 7/02*** | (2006.01) |
| ***C08L 23/0846*** | (2025.01) |
| ***C09J 11/06*** | (2006.01) |
| ***C09J 123/08*** | (2006.01) |
| ***D21H 19/22*** | (2006.01) |
| ***D21H 19/34*** | (2006.01) |

(52) U.S. Cl.
CPC .............. *C08F 216/06* (2013.01); *C08K 7/02* (2013.01); *C08L 23/0846* (2013.01); *C09J 11/06* (2013.01); *C09J 123/0846* (2013.01); *D21H 19/22* (2013.01); *D21H 19/34* (2013.01); *C08K 2201/011* (2013.01)

(58) Field of Classification Search
None
See application file for complete search history.

(56) References Cited

U.S. PATENT DOCUMENTS

2021/0108111 A1* 4/2021 Tanida .................... C08K 5/01

FOREIGN PATENT DOCUMENTS

| | | | | |
|---|---|---|---|---|
| EP | 3184693 A1 * | 6/2017 | | B65D 65/40 |
| JP | H10-121017 A | 5/1998 | | |
| JP | H11-106727 A | 4/1999 | | |
| JP | 2010-242063 A | 10/2010 | | |
| JP | 2014-218580 A | 11/2014 | | |
| JP | 2018-104650 A | 7/2018 | | |
| JP | 2018141050 A * | 9/2018 | | |
| JP | 2019-085169 A | 6/2019 | | |
| JP | 2019-156915 A | 9/2019 | | |
| WO | WO-2011040547 A1 * | 4/2011 | | B32B 23/06 |
| WO | WO-2019203216 A1 * | 10/2019 | | C09J 129/04 |

OTHER PUBLICATIONS

WO2011040547 English Machine Translation, prepared Apr. 28, 2025. (Year: 2025).*
JP2018141050 English machine translation, prepared Jul. 16, 2025. (Year: 2025).*
International Search Report issued in corresponding International Patent Application No. PCT/JP2021/013138 dated May 25, 2021.
Written Opinion issued in corresponding International Patent Application No. PCT/JP2021/013138 dated May 25, 2021.
Moritani et al., "Carbon-13 Nuclear Magnetic Resonance Study on Sequence Distribution and Anomalous Linkage in Ethylene-Vinyl Alcohol Copolymers," Macromolecules, 11(6): 1251-1259 (1978).

* cited by examiner

*Primary Examiner* — Christopher M Rodd
(74) *Attorney, Agent, or Firm* — Morgan, Lewis & Bockius LLP

(57) ABSTRACT

The present invention provides an aqueous dispersion that enables production of a film having improved water resistance, tensile elastic modulus, and stress at break, and with which a decrease of strain at break can be reduced in the film. The present invention relates to an aqueous dispersion comprising an ethylene-vinyl alcohol copolymer (A) and a cellulose nanofiber, the ethylene unit content of the ethylene-vinyl alcohol copolymer (A) being 1 mol % or more and less than 20 mol %.

20 Claims, 2 Drawing Sheets

AQUEOUS DISPERSION, AQUEOUS EMULSION, COATING AGENT, COATED PAPER, MULTILAYER STRUCTURE, PACKING MATERIAL, ADHESIVE AGENT, AND AQUEOUS EMULSION PRODUCTION METHOD

TECHNICAL FIELD

The present disclosure relates to an aqueous dispersion and aqueous emulsion comprising an ethylene-vinyl alcohol copolymer and a cellulose nanofiber, a coating agent constituted of the aqueous dispersion or aqueous emulsion, a coated paper and multilayer structure coated with the coating agent, and an adhesive agent constituted of the aqueous emulsion.

BACKGROUND ART

Polyvinyl alcohol (hereinafter, also referred to with the abbreviation "PVA") is a unique synthetic polymer having hydrophilicity and crystallinity, and is used in a wide range of applications such as adhesive agents, dispersants, fiber glues, wrapping films, binders, and paints.

A modifying agent is added as a technique to improve various qualities required for different applications. For example, it is stated in Patent Literature 1 that hot water resistance and heat resistance can improve by combining PVA with a cellulose nanofiber (hereinafter, also referred to with the abbreviation "CNF") having an average fiber diameter of 2 to 150 nm. It is stated in Patent Literature 2 that production of an easy-to-handle low-viscosity compound is possible by mixing PVA and CNF with a specific disperser.

Aqueous emulsions obtained by emulsion polymerization of a vinyl ester monomer with PVA used as a dispersant for emulsion polymerization are used in a wide variety of applications, including, for example, various adhesive agents for paper, woodworking, and plastics; various binders for impregnated paper and nonwoven fabric products; and chemical admixtures, concrete bonding agents, paints, and paper processing and fiber processing.

An example of such an aqueous emulsion is an emulsion prepared by copolymerization of a vinyl acetate monomer and N-methylolacrylamide, using PVA as a protective colloid (see Patent Literature 3). As another example, emulsion polymerization of vinyl acetate, or emulsion copolymerization of vinyl acetate and a (meth)acrylic acid ester is proposed in the presence of an ethylene-containing modified PVA as a protective colloid (see Patent Literature 4).

CITATION LIST

Patent Literature

Patent Literature 1: JP 2010-242063 A
Patent Literature 2: JP 2019-156915 A
Patent Literature 3: JP H10-121017A
Patent Literature 4: JP H11-106727A

SUMMARY OF INVENTION

Technical Problem

However, studies by the present inventors revealed that films prepared with the PVA- and CNF-containing compositions disclosed in Patent Literatures 1 and 2 show a notable reduction of strain at break compared to when CNF is absent, though the compositions can exhibit improved water resistance, tensile elastic modulus, and stress at break.

The aqueous emulsions disclosed in Patent Literatures 3 and 4 were found to be not necessarily satisfactory in terms of heatproof adhesive properties, and water resistance of when the aqueous emulsions are made into coatings.

It is accordingly an object of the present disclosure to provide an aqueous dispersion that enables production of a film having improved water resistance, tensile elastic modulus, and stress at break, and with which a decrease of strain at break can be reduced in the film.

Another object of the present disclosure is to provide an aqueous emulsion that excels in heatproof adhesive properties, and that shows excellent water resistance in a coating.

Solution to Problem

As a result of intensive studies, the present inventors found that the foregoing issues can be solved by the present disclosure. The present disclosure relates to the following.

[1] An aqueous dispersion comprising an ethylene-vinyl alcohol copolymer (A) and a cellulose nanofiber,
the ethylene unit content of the ethylene-vinyl alcohol copolymer (A) being 1 mol % or more and less than 20 mol %.

[2] The aqueous dispersion according to [1], wherein the ethylene-vinyl alcohol copolymer (A) has a viscosity-average degree of polymerization of 200 to 5,000.

[3] The aqueous dispersion according to [1] or [2], wherein the ethylene-vinyl alcohol copolymer (A) has a degree of saponification of 80 to 99.9 mol %.

[4] The aqueous dispersion according to any one of [1] to [3], wherein the content of the cellulose nanofiber is 0.1 to 40 parts by mass with respect to 100 parts by mass of the ethylene-vinyl alcohol copolymer (A).

[5] The aqueous dispersion according to any one of [1] to [4], wherein the total content of the ethylene-vinyl alcohol copolymer (A) and the cellulose nanofiber in the aqueous dispersion is 0.1 to 30 mass %.

[6] The aqueous dispersion according to any one of [1] to [5], wherein the ethylene-vinyl alcohol copolymer (A) has a block character of the ethylene unit of 0.90 to 0.99.

[7] An aqueous emulsion comprising an ethylene-vinyl alcohol copolymer (A) as a dispersant; a polymer (C) containing an ethylenically unsaturated monomer unit as a dispersoid; and a cellulose nanofiber,
the content of the cellulose nanofiber being 0.1 to 40 parts by mass with respect to 100 parts by mass of the ethylene-vinyl alcohol copolymer (A).

[8] The aqueous emulsion according to [7], wherein the total content of the ethylene-vinyl alcohol copolymer (A) and the cellulose nanofiber is 2 to 35 parts by mass with respect to 100 parts by mass of the polymer (C).

[9] The aqueous emulsion according to [7] or [8], wherein the ethylene unit content of the ethylene-vinyl alcohol copolymer (A) is 1 mol % or more and less than 20 mol %.

[10] The aqueous emulsion according to any one of [7] to [9], wherein the total content of the ethylene-vinyl alcohol copolymer (A), the polymer (C), and the cellulose nanofiber in solids contained in the aqueous emulsion is 55 mass % or more.

[11] The aqueous emulsion according to any one of [7] to [10], wherein the polymer (C) comprises 70 mass % or more of a monomer unit derived from at least one selected from the group consisting of a vinyl ester monomer, a (meth)acrylic acid ester monomer, a styrene monomer, and a diene monomer, with respect to all monomer units.

[12] A coating agent comprising an aqueous dispersion of any one of [1] to [6], or an aqueous emulsion of any one of [7] to [11].

[13] The coating agent according to [12], which is a paper coating agent.

[14] A coated paper comprising a paper, wherein the paper is coated with a paper coating agent of [13].

[15] The coated paper according to [14], which is a release paper base or a greaseproof paper.

[16] A multilayer structure comprising a substrate containing a resin, wherein the substrate is coated with a coating agent of [12].

[17] The multilayer structure according to [16], wherein the resin is at least one selected from the group consisting of a polyolefin resin, a polyester resin, and a polyamide resin.

[18] A packing material comprising a multilayer structure of [16] or [17].

[19] An adhesive agent comprising an aqueous dispersion of any one of [1] to [6], or an aqueous emulsion of any one of [7] to [11].

[20] A method for producing an aqueous emulsion of any one of [7] to [11], comprising:
- a step (1) of polymerizing an ethylenically unsaturated monomer by emulsion polymerization in the presence of an ethylene-vinyl alcohol copolymer (A) to obtain an aqueous emulsion; and
- a step (2) of adding a cellulose nanofiber to the aqueous emulsion.

[21] A method for producing an aqueous emulsion of any one of [7] to [11], comprising:
- a step (3) of obtaining an aqueous dispersion containing an ethylene-vinyl alcohol copolymer (A) and a cellulose nanofiber; and
- a step (4) of mixing the aqueous dispersion with an ethylenically unsaturated monomer to allow emulsion polymerization.

Advantageous Effects of Invention

According to the present disclosure, an aqueous dispersion can be provided that enables production of a film having improved water resistance, tensile elastic modulus, and stress at break, and with which a decrease of strain at break can be reduced in the film.

According to the present disclosure, an aqueous emulsion can be provided that excels in heatproof adhesive properties, and that shows excellent water resistance in a coating.

DESCRIPTION OF EMBODIMENTS

Figure 1:
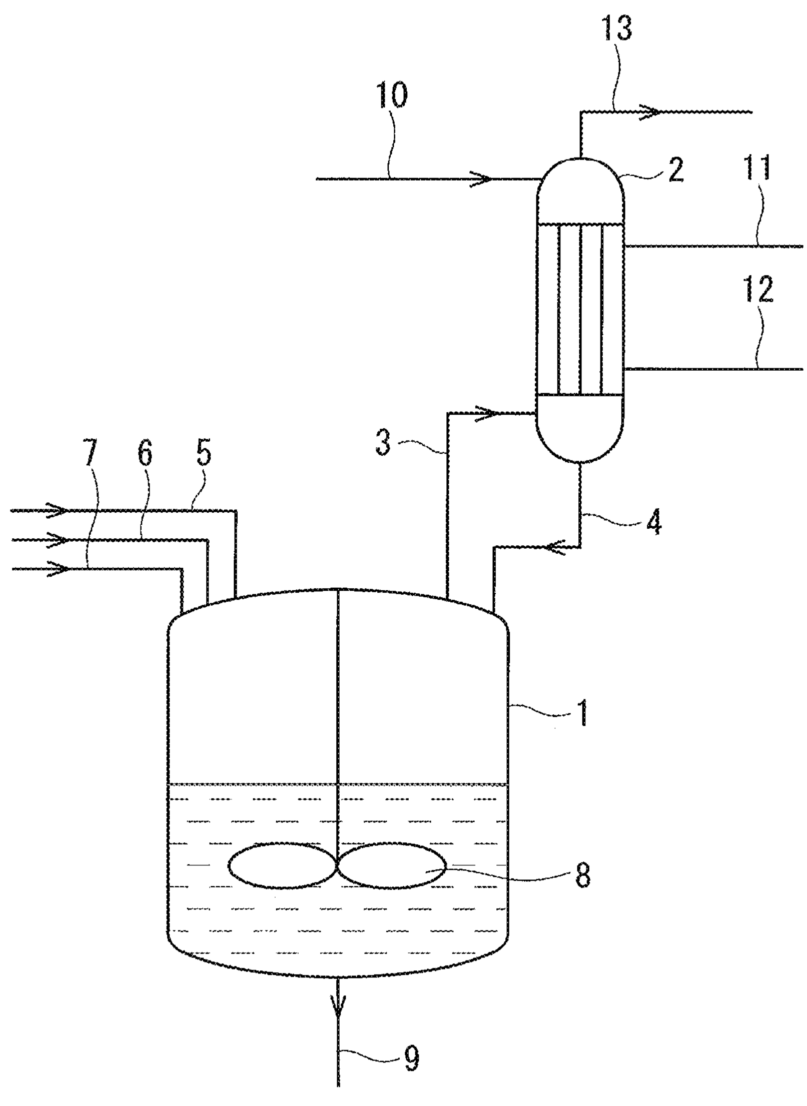
FIG. 1 is a schematic diagram of a polymerizer used in Production Examples 1 to 6.

Embodiments of the present disclosure are described below. The present disclosure is not limited to the embodiments below.

A specific example embodiment of the present disclosure is an aqueous dispersion comprising s an ethylene-vinyl alcohol copolymer (A) and a cellulose nanofiber (hereinafter, also referred to with the abbreviation "CNF"), the ethylene unit content of the ethylene-vinyl alcohol copolymer (A) being 1 mol % or more and less than 20 mol %.

Another example embodiment of the present disclosure is an aqueous emulsion comprising an ethylene-vinyl alcohol copolymer (A) as a dispersant; a polymer (C) containing an ethylenically unsaturated monomer unit as a dispersoid (hereinafter, also referred to simply as "polymer (C)"); and a cellulose nanofiber, the content of the cellulose nanofiber being 0.1 to 40 parts by mass with respect to 100 parts by mass of the ethylene-vinyl alcohol copolymer (A).

Ethylene-Vinyl Alcohol Copolymer (A)

The ethylene-vinyl alcohol copolymer (A) is a polymer containing an ethylene unit and a vinyl alcohol unit.

A film prepared with an aqueous dispersion containing a vinyl alcohol polymer with no ethylene unit and containing a CNF shows improvement in water resistance, tensile elastic modulus, and stress at break, but involves a serious decrease of strain at break, as compared to when the aqueous dispersion does not contain a CNF. By containing the ethylene-vinyl alcohol copolymer (A), an aqueous dispersion of the present disclosure can exhibit excellent water resistance, tensile elastic modulus, and stress at break when used to make a film, while maintaining the strain at break of the film. In order for the present disclosure to exhibit such effects, it is important that the ethylene unit content of the ethylene-vinyl alcohol copolymer (A) contained in an aqueous dispersion of the present disclosure be 1 mol % or more and less than 20 mol %.

By containing the ethylene-vinyl alcohol copolymer (A), an aqueous emulsion of the present disclosure shows excellent heatproof adhesive properties, and excellent water resistance in a coating.

The ethylene unit content of the ethylene-vinyl alcohol copolymer (A) contained in an aqueous dispersion of the present disclosure is 1 mol % or more and less than 20 mol %.

The ethylene unit content of the ethylene-vinyl alcohol copolymer (A) contained in an aqueous emulsion of the present disclosure is not particularly limited.

The ethylene unit content of the ethylene-vinyl alcohol copolymer (A) in the aqueous dispersion is 1 mol % or more and less than 20 mol %. The ethylene unit content is preferably 1.5 mol % or more, more preferably 2 mol % or more. The preferred ethylene unit content may be 2.5 mol % or more, 3 mol % or more, or 3.5 mol % or more. With these lower limits of ethylene unit content, an aqueous dispersion of the present disclosure, when used to make a film, can provide improved water resistance, tensile elastic modulus, and stress at break to the film while reducing a decrease of strain at break in the film. With the foregoing lower limits of ethylene unit content, a coated paper prepared with a coating agent constituted of an aqueous dispersion of the present disclosure tends to have excellent waterproofing strength and solvent barrier properties, or show excellent oil resistance even when folded. A multilayer structure prepared with the coating agent tends to exhibit excellent gas barrier properties. The ethylene unit content of the ethylene-vinyl alcohol copolymer (A) in the aqueous emulsion is preferably 1 mol % or more, more preferably 1.5 mol % or more, even more preferably 2 mol % or more. The preferred ethylene unit content may be 2.5 mol % or more, 3 mol % or more, or 3.5 mol % or more. With these lower limits of ethylene unit content, a coating of an aqueous emulsion of the present disclosure shows even superior water resistance. In the aqueous dispersion, the ethylene unit content is preferably less than 15 mol %, more preferably less than 13 mol %, even more preferably less than 10 mol %. The preferred ethylene unit content may be less than 8 mol %, or less than 5 mol %. In the aqueous emulsion, the ethylene unit content is preferably less than 20 mol %, more preferably less than 15 mol %, even more preferably less than 13 mol %, particularly preferably less than 10 mol %. The preferred ethylene unit content may be less than 8 mol %, or less than 5 mol %. In the aqueous dispersion or aqueous emulsion, the ethylene-vinyl alcohol copolymer (A) having these upper limits of ethylene unit content shows excellent water solubility, and makes it easier to produce an aqueous dispersion or aqueous emulsion of the present disclosure. With the foregoing upper limits of ethylene unit content, the CNF can be desirably dispersed, and the storage stability of an aqueous dispersion of the present disclosure can improve. It is also possible to reduce coating unevenness in a coating agent constituted of an aqueous dispersion of the present disclosure.

The ethylene unit content of ethylene-vinyl alcohol copolymer (A) can be determined by $^1$H-NMR measurement. For example, the ethylene unit content is determined by taking a $^1$H-NMR measurement of an ethylene unit-containing vinyl ester copolymer representing a precursor or a re-acetified product of ethylene-vinyl alcohol copolymer (A). More specifically, the vinyl ester copolymer is purified by reprecipitation at least 3 times with a mixture of n-hexane and acetone, and dried under reduced pressure at 80° C. for 3 days to obtain a vinyl ester copolymer to be used for analysis. The vinyl ester copolymer is then measured at 80° C. with a $^1$H-NMR measurement device (for example, 500 MHz) after being dissolved in DMSO-$d_6$. The ethylene unit content can then be calculated from a peak (4.7 to 5.2 ppm) derived from the backbone methine of vinyl ester, and peaks (0.8 to 1.6 ppm) derived from the backbone methylene of ethylene, vinyl ester, and a third component (a monomer other than ethylene or vinyl ester).

The ethylene-vinyl alcohol copolymer (A) has a viscosity-average degree of polymerization of preferably 200 or more, more preferably 250 or more, even more preferably 300 or more. The preferred viscosity-average degree of polymerization may be 400 or more, 500 or more, 600 or more, 700 or more, 900 or more, 1,100 or more, or 1,300 or more. With these lower limits of viscosity-average degree of polymerization, an aqueous dispersion of the present disclosure, when used to make a film, tends to provide excellent strength to the film. With the foregoing lower limits of viscosity-average degree of polymerization, a coating of an aqueous emulsion of the present disclosure shows even superior mechanical stability. The viscosity-average degree of polymerization is preferably 5,000 or less, more preferably 4,500 or less, even more preferably 4,000 or less. The preferred viscosity-average degree of polymerization may be 3,800 or less, 3,500 or less, 3,000 or less, 2,700 or less, 2,500 or less, 2,300 or less, or 2,000 or less. These upper limits of viscosity-average degree of polymerization are advantageous because it allows the aqueous dispersion to have a moderately low viscosity, and improves the coatability of an aqueous dispersion of the present disclosure when the aqueous dispersion is used as a coating agent, for example. With the foregoing upper limits of viscosity-average degree of polymerization, the aqueous emulsion tends to have improved ease of handling.

The viscosity-average degree of polymerization of ethylene-vinyl alcohol copolymer (A) is measured according to JIS K 6726:1994. Specifically, the ethylene-vinyl alcohol copolymer (A) is measured for limiting viscosity [η] (liter/g) in 30° C. water, and the viscosity-average degree of polymerization P is calculated from the value of limiting viscosity [η], using the formula below. When the degree of saponification of ethylene-vinyl alcohol copolymer (A) is less than 99.5 mol %, the limiting viscosity [η] is measured after the ethylene-vinyl alcohol copolymer (A) is saponified to a degree of saponification of 99.5 mol % or more.

$$P=([\eta]\times10^4/8.29)^{(1/0.62)}$$

The degree of saponification of ethylene-vinyl alcohol copolymer (A) is preferably 80 mol % or more, more preferably 83 mol % or more, even more preferably 85 mol % or more. The preferred degree of saponification may be 87 mol % or more, or 90 mol % or more. With these lower limits of degree of saponification, the ethylene-vinyl alcohol copolymer (A) can have even superior water solubility and emulsion polymerization stability. The degree of saponification of ethylene-vinyl alcohol copolymer (A) is preferably 99.9 mol % or less, more preferably 99.5 mol % or less, even more preferably 99 mol % or less, particularly preferably 98.5 mol % or less. The ethylene-vinyl alcohol copolymer (A) can be produced more stably with these upper limits of degree of saponification. The degree of saponification of ethylene-vinyl alcohol copolymer (A) is measured according to JIS K6726:1994.

The content of the 1,2-glycol linkage unit in the ethylene-vinyl alcohol copolymer (A) is preferably 1.2 mol % or more, more preferably 1.3 mol % or more, even more preferably 1.4 mol % or more. With these lower limits of 1,2-glycol linkage unit content, the ethylene-vinyl alcohol copolymer (A) can be produced with good productivity, and the aqueous dispersion and aqueous emulsion tend to have superior viscosity stability. The 1,2-glycol linkage unit content of ethylene-vinyl alcohol copolymer (A) is preferably 2.0 mol % or less, more preferably 1.9 mol % or less, even more preferably 1.8 mol % or less. With these upper limits of 1,2-glycol linkage unit content, the ethylene-vinyl alcohol copolymer (A) can be produced with good productivity, and tends to have a superior hue. The 1,2-glycol linkage unit content of ethylene-vinyl alcohol copolymer (A) can be determined by $^1$H-NMR measurement. Specifically, the ethylene-vinyl alcohol copolymer (A) is saponified to a degree of saponification of 99.9 mol % or more, and, after thorough washing with methanol, dried under reduced pressure at 90° C. for 2 days. The resulting fully saponified ethylene-vinyl alcohol copolymer is dissolved in DMSO-$d_6$, and a specimen prepared by adding a few drops of trifluoroacetic acid is subjected to a $^1$H-NMR measurement (500 MHz) at 80° C. A peak derived from the methine proton of the vinyl alcohol unit occurs at 3.2 to 4.0 ppm (integration value A), whereas a peak derived from one of the methine protons of the 1,2-glycol linkage occurs near 3.15 to 3.35 ppm (integration value B). The content of 1,2-glycol linkage unit can be calculated from the following formula.

$$\text{Amount of 1,2-glycol linkage(mol \%)}=B/A\times100$$

The ethylene-vinyl alcohol copolymer (A) has a block character of the ethylene unit of preferably 0.70 or more, more preferably 0.80 or more, even more preferably 0.90 or more. The preferred block character may be 0.93 or more, or 0.95 or more. With these lower limits of block character, an aqueous dispersion of the present disclosure tends to have excellent viscosity stability, or show excellent high-speed coatability when used as an adhesive agent. With the foregoing lower limits of block character, an aqueous emulsion of the present disclosure can have even superior low-temperature storage stability, and even superior heatproof adhesive properties. The ethylene-vinyl alcohol copolymer (A) has a block character of the ethylene unit of preferably 1.1 or less. The preferred block character may be 1.05 or less, 1.0 or less, or 0.99 or less. With these upper limits of block character, an aqueous dispersion of the present disclosure, when used to make a film, tends to provide even superior water resistance to the film (coating). With the foregoing upper limits of block character, an aqueous emulsion of the present disclosure shows even superior heatproof adhesive properties.

By containing ethylene-vinyl alcohol copolymer (A) and CNF, an aqueous dispersion of the present disclosure, when used to make a film, can exhibit excellent water resistance, tensile elastic modulus, and stress at break in the film while maintaining the strain at break of the film. By containing ethylene-vinyl alcohol copolymer (A) and CNF, a coating agent of the present disclosure can provide a coated paper that exhibits excellent waterproofing strength and solvent barrier properties, and shows excellent oil resistance even when folded, or a multilayer structure having excellent gas barrier properties. Despite these superior advantages of an aqueous dispersion of the present disclosure, an aqueous dispersion containing an ethylene unit-containing vinyl alcohol polymer and CNF, in general, is not necessarily superior in terms of CNF dispersibility to an aqueous dispersion containing PVA and CNF. Presumably, this is because, compared to a PVA-containing aqueous dispersion in which the interaction between PVA and CNF inhibits the association or aggregation of CNF, an aqueous dispersion containing an ethylene unit-containing vinyl alcohol polymer has a weaker interaction between vinyl alcohol polymer and CNF by the presence of the ethylene unit, and cannot inhibit association or aggregation of CNF as easily as when PVA is present. However, by confining the block character of the ethylene unit which the ethylene-vinyl alcohol copolymer (A) has in the specific ranges, an aqueous dispersion of the present disclosure can desirably maintain dispersibility while exhibiting the above effect produced by containing ethylene-vinyl alcohol copolymer (A) and CNF. This tends to produce superior storage stability and coatability in a coating agent constituted of an aqueous dispersion of the present disclosure. From these perspectives, the block character of the ethylene unit which the ethylene-vinyl alcohol copolymer (A) has is preferably 0.90 or more, more preferably 0.93 or more, even more preferably 0.95 or more, and is preferably 0.99 or less, more preferably less than 0.99, even more preferably 0.98 or less. The ethylene-vinyl alcohol copolymer (A) having the block character of ethylene unit falling in these ranges can be produced by the methods described below.

Here, the block character is a numerical value representing the distribution of ethylene units and vinyl alcohol units, the latter being units that result from saponification of vinyl ester units, and the block character takes a value between 0 and 2. The block character is 0 when the ethylene unit or vinyl alcohol unit is fully distributed in blocks. The extent of alternation increases as the value increases, with 1 indicating that the ethylene unit and the vinyl alcohol unit are present all at random, and 2 indicating that the ethylene unit and the vinyl alcohol unit are occurring in a completely alternating fashion. The block character is determined by $^{13}$C-NMR, as follows. First, the ethylene-vinyl alcohol copolymer (A) is saponified to a degree of saponification of 99.9 mol % or more, and, after thorough washing with methanol, dried under reduced pressure at 90° C. for 2 days. The resulting fully saponified ethylene-vinyl alcohol copolymer is then dissolved in DMSO-$d_6$, and the resultant specimen is measured with a $^{13}$C-NMR measurement device at 500 MHz (NMR spectrometer GX-500, manufactured by JEOL Ltd.) at 80° C. By using the formula below, the block character (η) of ethylene unit is then determined using the molar fraction (AE) of the diad of vinyl alcohol and ethylene, the molar fraction (A) of vinyl alcohol unit, and the molar fraction (E) of ethylene unit, after determining signals and calculating these mole fractions from the spectrum chart according to the method described in T. Moritani and H. Iwasaki, Vol. 11, No. 6, pp. 1251-1259, Macromolecules (1978).

$$\eta=(AE)/\{2\times(A)\times(E)\}$$

The ethylene-vinyl alcohol copolymer (A) may contain a monomer unit other than the vinyl alcohol unit, the ethylene unit, or the vinyl ester unit, provided that it does not hinder the effects of the present disclosure. Examples of such monomers include:

α-olefins such as propylene, n-butene, and isobutylene;
acrylic acid and salts thereof;
acrylic acid esters;
methacrylic acid and salts thereof;
methacrylic acid esters;
acrylamides;
derivatives of acrylamides, such as N-methylacrylamide, N-ethylacrylamide, N,N-dimethylacrylamide, diacetoneacrylamide, acrylamidopropanesulfonic acid and salts thereof, acrylamidopropyldimethylamine and salts or quaternary salts thereof, and N-methylolacrylamide and derivatives thereof;
methacrylamides;
derivatives of methacrylamides, such as N-methylmethacrylamide, N-ethylmethyacrylamide, methacrylamidopropanesulfonic acid and salts thereof, methacrylamidopropyldimethylamine and salts or quaternary salts thereof, N-methylolmethacrylamide and derivatives thereof;
vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether;
nitriles such as acrylonitrile and methacrylonitrile;
vinyl halides such as vinyl chloride and vinyl fluoride;
vinylidene halides such as vinylidene chloride and vinylidene fluoride;
allyl compounds such as allyl acetate and allyl chloride;
unsaturated dicarboxylic acids such as maleic acid, itaconic acid, and fumaric acid, and salts or esters thereof;
vinyl silyl compounds such as vinyltrimethoxysilane; and
isopropenyl acetate.

The content of these monomers is preferably 10 mol % or less, more preferably less than 5 mol %, even more preferably less than 1 mol %, particularly preferably less than 0.5 mol %, and may be 0 mol %, though the monomer content depends on factors such as intended use and applications.

Method of Production of Ethylene-Vinyl Alcohol Copolymer (A)

The ethylene-vinyl alcohol copolymer (A) is obtained through, for example, copolymerization of ethylene and a vinyl ester monomer into an ethylene-vinyl ester copolymer, and subsequent saponification of the ethylene-vinyl ester copolymer with a saponification catalyst such as sodium hydroxide, optionally followed by pulverization and/or drying.

Copolymerization of ethylene and a vinyl ester monomer can be achieved by a known method, for example, such as bulk polymerization, solution polymerization, suspension polymerization, or emulsion polymerization. Typically, bulk polymerization or solution polymerization is used in which polymerization takes place without a solvent or in a solvent such as an alcohol. Examples of the alcohol include lower alcohols such as methanol, ethanol, and propanol. The initiator used for copolymerization may be a known polymerization initiator such as an azo initiator or a peroxide initiator, for example, such as 2,2'-azobis(isobutyronitrile), 2,2'-azobis(4-methoxy-2,4-dimethylvaleronitrile), 2,2'-azobis(2,4-dimethyl-valeronitrile), benzoyl peroxide, and n-propyl peroxydicarbonate.

The polymerization temperature is not particularly limited, and is preferably 0° C. to 150° C., more preferably room temperature to 150° C., even more preferably room temperature to the boiling point of the solvent used, particularly preferably 30 to 60° C.

Examples of the vinyl ester monomer include vinyl formate, vinyl acetate, vinyl propionate, vinyl valerate, vinyl caprate, vinyl laurate, vinyl stearate, vinyl benzoate, vinyl pivalate, and vinyl versatate. Preferred is vinyl acetate.

A chain transfer agent may be used for the copolymerization of ethylene and a vinyl ester monomer. Examples of the chain transfer agent include aldehydes such as acetaldehyde, propionaldehyde, butyl aldehyde, and benzaldehyde; ketones such as acetone, methyl ethyl ketone, hexanone, and cyclohexanone; mercaptans such as 2-hydroxyethanethiol; thiocarboxylic acids such as thioacetic acid; and halogenated hydrocarbons such as trichloroethylene, and perchloroethylene. Preferred are aldehydes and ketones. When using a chain transfer agent, the amount of chain transfer agent is not particularly limited, and may be decided according to the chain transfer coefficient of the chain transfer agent used, and the desired degree of polymerization of ethylene-vinyl alcohol copolymer (A). Preferably, 0.1 to 10 parts by mass of a chain transfer agent is used for 100 parts by mass of the vinyl ester monomer.

The ethylene-vinyl ester copolymer obtained in the polymerization step is saponified to obtain the ethylene-vinyl alcohol copolymer (A). Here, the ethylene-vinyl ester copolymer is preferably saponified by an alcoholysis or hydrolysis reaction in the presence of a catalyst in an organic solvent. The catalyst used in the saponification step may be, for example, a basic catalyst such as sodium hydroxide, potassium hydroxide, or sodium methoxide, or an acid catalyst such as sulfuric acid, hydrochloric acid, or p-toluenesulfonic acid. The organic solvent used in the saponification step is not particularly limited, and may be, for example, an alcohol such as methanol or ethanol; an ester such as methyl acetate or ethyl acetate; a ketone such as acetone or methyl ethyl ketone; or an aromatic hydrocarbon such as benzene or toluene. These may be used alone, or two or more thereof may be used in combination. Preferably, it is convenient to use methanol or a mixed solution of methanol and methyl acetate as solvent, and perform a saponification reaction in the presence of basic catalyst sodium hydroxide. Preferably, the saponification catalyst is used in a mole ratio of 0.001 to 0.5 with respect to the vinyl ester unit of the ethylene-vinyl ester copolymer. The mole ratio is more preferably 0.002 or more. The mole ratio is more preferably 0.4 or less, even more preferably 0.3 or less.

The saponification step may be followed by a pulverization step and a drying step. The pulverization step may be divided into a preliminary pulverization step and a main pulverization step. After the saponification step, an optional washing step may be carried out to remove impurities such as sodium acetate.

In the method of production of ethylene-vinyl alcohol copolymer (A) according to the present disclosure, it is preferable that the ethylene-vinyl ester copolymer be obtained by a process that includes (a) the step of contacting a vinyl ester-containing solution with ethylene-containing gas while agitating the vinyl ester-containing solution with a wide-paddle impeller in a polymerization vessel so as to bring the agitation power Pv to 0.5 to 10 kW/m$^3$ per unit volume, and the Froude number Fr to 0.05 to 0.2. By contacting a vinyl ester-containing solution with ethylene-containing gas using such a method, the ethylene-vinyl alcohol copolymer (A) can have a block character of the ethylene unit of 0.70 to 0.99, preferably 0.90 to 0.99.

The following describes a specific polymerizer, and a polymerization step using same, with reference to the drawings. FIG. 1 is a schematic diagram of the polymerizer used in Production Example 1. The polymerizer is a continuous stirred-tank reactor with a polymerization vessel 1 connected to a heat exchanger 2 via conduits 3 and 4. Inside of the heat exchanger 2 is where vinyl ester and ethylene can contact in counterflows.

A plurality of conduits 5, 6, and 7 is connected to the polymerization vessel 1. The number and layout of conduits are not limited to the embodiment shown in the figure. Through these conduits are supplied ethylene, a polymerization initiator, and an organic solvent to the polymerization vessel 1. The fraction of the feedstock introduced into the polymerization vessel per unit time is preferably 0.1 to 20 parts by mass for ethylene, 1 to 100 parts by mass for organic solvent, and 0.00001 to 1 parts by mass for polymerization initiator with respect to 100 parts by mass of the vinyl ester. In certain cases, the vinyl ester and other monomers may be supplied through these conduits. The reaction liquid in the polymerization vessel 1 continuously discharges through the reaction liquid drain pipe 9 connected at the bottom of the polymerization vessel 1.

Inside the polymerization vessel 1 is installed an agitator 8 having a wide-paddle impeller as an impeller. The wide-paddle impeller agitates the vinyl ester-containing solution, allowing it to contact ethylene-containing gas, and produce the ethylene-vinyl ester copolymer through the reaction between ethylene and vinyl ester.

Figure 2:
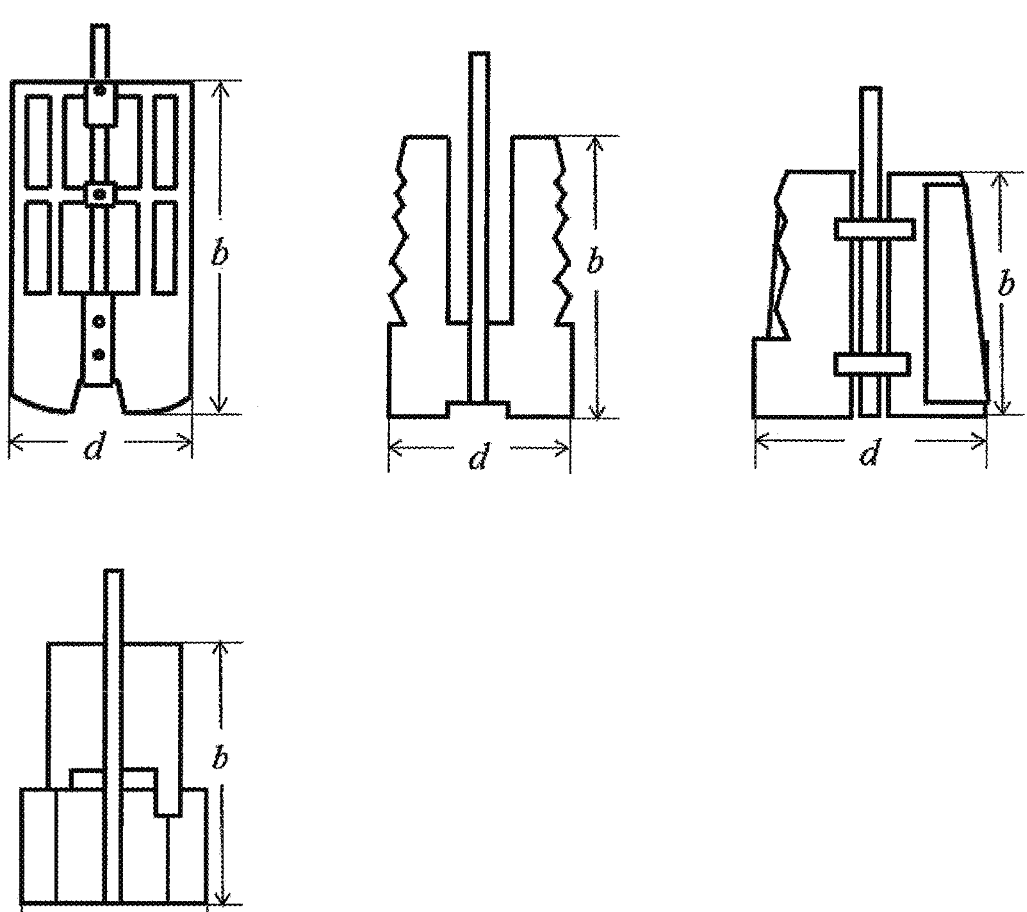
FIG. 2 is a schematic diagram representing examples of a wide-paddle impeller.

Preferably, a wide-paddle impeller is used as the impeller that agitates the vinyl ester-containing solution. FIG. 2 is a schematic diagram representing examples of the wide-paddle impeller used in the present disclosure. As shown in FIG. 2, a characteristic feature of the wide-paddle impeller is that the impeller has wide a paddle of a large width b. The width b of the wide-paddle impeller can be appropriately adjusted according to parameters such as the capacity of polymerization vessel 1. However, the width b is preferably 1 to 10 m, as will be described below. The use of such a paddle enables the solution to be evenly mixed throughout from the bottom to the surface, and allows the vinyl ester-containing solution to efficiently absorb ethylene. The wide-paddle impeller may be a single-paddle impeller (for example, a Maxblend impeller), or a multi-paddle impeller (for example, a Fullzone impeller). In view of more efficient absorption of ethylene into the vinyl ester, it is preferable that the surface of the vinyl ester-containing solution be near the upper end of the impeller while being agitated. Specific examples of the wide-paddle impeller include a Maxblend impeller (Sumitomo Heavy Industries Process Equipment Co., Ltd.), a Fullzone impeller (Kobelco Eco-Solutions Co., Ltd.), a Sanmeller impeller (Mitsubishi Heavy Industries, Ltd.), a Hi-Fi mixer impeller (Soken Chemical & Engineering Co., Ltd.), a Super-Mix impeller (Super-Mix MR203, Super-Mix MR205; Satake Chemical Equipment MFG., Ltd.), and a Bendleaf impeller (GL Hakko Co., Ltd.).

The ethylene pressure in the polymerization vessel during polymerization is preferably 0.01 to 0.9 MPa, more preferably 0.05 to 0.8 MPa, even more preferably 0.1 to 0.7 MPa. Typically, the polymerization conversion rate of vinyl ester at the exit of the polymerization vessel is preferably 10 to 90%, more preferably 15 to 85%, though it is not particularly limited.

Typically, the polymerization temperature is preferably 0 to 180° C., more preferably 20 to 160° C., even more preferably 30 to 150° C., though it is not particularly limited.

For the reaction of ethylene and vinyl ester, it is preferable that the vinyl ester-containing solution in the polymerization vessel be agitated so as to bring the agitation power Pv to 0.5 to 10 $kW/m^3$ per unit volume of the vinyl ester-containing solution. When the agitation power is less than 0.5 $kW/m^3$, the vinyl ester cannot incorporate a sufficient amount of ethylene, and the reaction liquid cannot have a sufficient level of homogeneity, failing to produce the ethylene-vinyl alcohol copolymer (A) having a block character of the ethylene unit of 0.90 to 0.99. The agitation power is more preferably 1 $kW/m^3$ or more, even more preferably 1.5 $kW/m^3$ or more. An agitation power of more than 10 $kW/m^3$ is not preferable from an industry standpoint because it translates into a very large operation power. The agitation power is more preferably 7 $kW/m^3$ or less, even more preferably 5 $kW/m^3$ or less. The agitation power Pv per unit volume of vinyl ester-containing solution is measured by the method described in the EXAMPLES section below.

The Froude number Fr is a ratio of a fictitious force to gravity as defined by the following formula, and represents an index of the shape of a vortex at the liquid surface.

$$Fr=n^2\times d/g,$$

where n represents the rotational speed of impeller (rps), d represents the impeller diameter (m), and g represents the gravitational acceleration ($m/s^2$).

For the reaction of ethylene and vinyl ester, it is preferable that the vinyl ester-containing solution in the polymerization vessel be agitated so as to bring the Froude number Fr to 0.05 to 0.2. By controlling the shape of a vortex at the liquid surface with the Froude number Fr adjusted in this range, moderate absorption of ethylene into the vinyl ester takes place, and this appears to enable easy production of the ethylene-vinyl alcohol copolymer (A) having an ethylene unit having a block character of the ethylene unit of 0.90 to 0.99. The Froude number Fr is more preferably 0.06 or more, even more preferably 0.07 or more. The Froude number Fr is more preferably 0.18 or less, even more preferably 0.15 or less. The Froude number Fr can be confined in these ranges by appropriately varying the rotational speed or diameter of the impeller.

The impeller diameter d of the wide-paddle impeller is not particularly limited, as long as the agitation power Pv and the Froude number Fr are adjusted to fall in the foregoing ranges. In view of improvement of ethylene absorption efficiency, the impeller diameter d is preferably 0.5 to 5 m. More preferably, the impeller diameter d is 0.75 m or more. The impeller diameter d is preferably 4 m or less. The impeller diameter d is a value two times the distance from the rotating shaft to the tip of the impeller (the farthest point from the rotating shaft).

The width b (the length along the height direction) of the wide-paddle impeller (paddle) is adjusted according to parameters such as the capacity of the polymerization vessel 1, and is not particularly limited. In view of improvement of ethylene absorption efficiency, the width b is preferably 1 to 10 m. More preferably, the width b is 1.5 m or more. The width b is more preferably 8 m or less.

The ratio (b/d) of the width (paddle width) b to the impeller diameter d of the wide-paddle impeller is adjusted according to parameters such as the shape of the polymerization vessel 1, and is not particularly limited. In view of improvement of ethylene absorption efficiency, the ratio b/d is preferably 1 or more. More preferably, the ratio b/d is 1.5 or more. The ratio b/d is typically 2.5 or less.

The shape of polymerization vessel 1 is not particularly limited. Normally, the polymerization vessel is substantially cylindrical in shape. In this case, the wide-paddle impeller is disposed in the polymerization vessel 1 of a substantially cylindrical shape in such a manner that the rotating shaft of the wide-paddle impeller lies on the rotational axis of the polymerization vessel 1. The ratio (d/D) of impeller diameter d (m) to the inner diameter D (m) of the polymerization vessel is not particularly limited, as long as it does not interfere with the effects of the present disclosure. The ratio d/D may be appropriately adjusted according to the polymerization vessel used, and is typically 0.4 to 0.9. The capacity of the polymerization vessel is typically 1 to 200 kl, though it is not particularly limited.

The rotational speed n of the impeller is adjusted so as to bring the agitation power Pv and the Froude number Fr to the foregoing ranges, and is not particularly limited. Preferably, the rotational speed n of the impeller is 0.5 to 1.35 rps. When the rotational speed n is less than 0.5 rps, supercooling of the polymerization solution becomes more likely to occur near the heating surface, and this may pose difficulty in long-term operation by generating a gelatinous material on the inner wall of the polymerization vessel. When the rotational speed n is higher than 1.35 rps, the polymerization solution may splash when it has low viscosity, and may stick to the inner wall of the gas-phase portion of the polymerization vessel. Such a cohesive material forms a foreign object when it solidifies and mixes into the polymerization solution, and may interfere with stable operation.

Conventionally, an ethylene-vinyl alcohol copolymer is produced by controlling the agitation power per unit volume, which represents an index of agitation intensity. However, the agitation power is affected by a variety of factors, including the capacity, viscosity, and density of reaction liquid, the shape of a polymerization vessel, and the shape and rotational speed of an impeller. Accordingly, intricate control of the blockiness of the ethylene unit is difficult to achieve, an extension of ethylene chain (block formation of ethylene unit) results when agitation power is controlled alone. This produces an ethylene-vinyl alcohol copolymer having a block character of the ethylene unit of less than 0.90. However, a copolymer having a shorter ethylene chain (the ethylene unit is occurring in random positions) than conventional copolymers can be obtained when the polymerization reaction is allowed to proceed under specific conditions.

In view of enabling more sophisticated control of the block character of ethylene unit, it is preferable in the foregoing production method that the polymerization vessel used in the polymerization step be connected to the heat exchanger via pipes, and that the method, in obtaining the ethylene-vinyl ester copolymer, additionally include the steps of (b) introducing ethylene-containing gas present in the gas-phase portion of the polymerization vessel into the heat exchanger, (c) feeding vinyl ester to the heat exchanger, (d) contacting the vinyl ester and the ethylene-containing gas in the heat exchanger, and (e) discharging the vinyl ester with the dissolved ethylene from the heat exchanger into the polymerization vessel. It is possible to feed vinyl ester directly into the polymerization vessel without feeding it through the heat exchanger. However, when fed to the polymerization vessel after being allowed to absorb ethylene in the heat exchanger in advance, the vinyl ester can efficiently absorb ethylene, and enables the block character of the ethylene unit to be controlled in a sophisticated fashion. Only a portion of the vinyl ester fed to the polymerization vessel may be brought into contact with the ethylene-containing gas in the heat exchanger. It is, however, preferable that all the vinyl ester fed to the polymerization vessel be brought into contact with the ethylene-containing gas in the heat exchanger.

The heat exchanger used is not particularly limited. However, in view of efficient absorption of ethylene, it is preferable to use a heat exchanger having a large surface area. Examples of such heat exchangers include a vertical wetted-wall heat exchanger, a vertical wetted-wall shell-and-tube heat exchanger, and a heat exchanger equipped with a jacket and/or a coil in a packed-column or porous-plate absorber or a bubble-cap absorber. More preferred are vertical wetted-wall shell-and-tube heat exchangers.

The apparatus shown in FIG. 1 uses a vertical wetted-wall shell-and-tube heat exchanger as heat exchanger 2. The heat exchanger 2 is connected to a vinyl ester feed pipe 10, through which vinyl ester is fed to the upper portion of the heat exchanger 2. The feedstock vinyl ester may be a vinyl ester used alone, or a mixed solution containing vinyl ester and an organic solvent such as above. Preferred is the latter.

Refrigerant pipes 11 and 12 are connected to the heat exchanger 2 shown in FIG. 1. The pipe positions are not limited to the example shown in the figure. It is, however, preferable that the refrigerant be supplied through the refrigerant pipe 12 connected to a lower portion of the heat exchanger 2, and be discharged through the refrigerant pipe 11 connected to an upper portion of the heat exchanger 2. By connecting the pipes in this fashion, the vinyl ester can be efficiently cooled for improved ethylene absorption efficiency. The cooling medium is not particularly limited, and may be an aqueous solution of an alcohol such as methanol, ethanol, ethylene glycol, or glycerin, or an aqueous solution of a common salt or calcium chloride, or may be chlorofluorocarbon. For reasons such as ease of handing and cost, preferred for use are alcohol aqueous solutions, particularly an aqueous solution of methanol.

A gas discharge pipe 13 for discharging gas from the heat exchanger 2 is connected to an upper portion of the heat exchanger 2. The gas discharge pipe 13 may be coupled to a mist separator (not illustrated). The mist separator removes the liquid droplets in the discharged gas, enabling ethylene to be collected or released mist-free. The mist separator is a device that uses an external force such as gravity, a centrifugal force, or an electrostatic force, or takes advantage of the screening or sieving effect to separate liquid droplets suspended in the gas. Examples of the mist separator include a gravitational settling chamber, a cyclone separator, an electric dust collector, a scrubber, a bag filter, and a packed bed. Preferred are cyclone separators.

The method by which the vinyl ester and ethylene-containing gas are contacted each other in the heat exchanger 2 is not particularly limited. For example, vinyl ester and ethylene-containing gas may be brought into contact with each other in counterflows inside the heat exchanger 2 by supplying pressurized ethylene-containing gas to a lower portion of heat exchanger 2 while providing a downflow of vinyl ester from an upper portion of the heat exchanger 2. As another example, vinyl ester and ethylene-containing gas may be brought into contact with each other in parallel flows inside the heat exchanger 2 by supplying pressurized ethylene-containing gas to an upper portion of heat exchanger while providing a downflow of vinyl ester from an upper portion of the heat exchanger 2. The former method is preferred in view of efficient ethylene absorption.

In the apparatus shown in FIG. 1, two conduits 3 and 4 connect the polymerization vessel 1 and the heat exchanger 2. The ethylene-containing gas in the polymerization vessel 1 is introduced into the heat exchanger 2 through the conduit 3 at a lower portion of the heat exchanger 2, whereas the vinyl ester that has absorbed ethylene is introduced into the polymerization vessel 1 through the conduit 4 from a lower portion of the heat exchanger 2.

The vinyl ester is supplied to the heat exchanger 2 through the feed pipe 10. The vinyl ester introduced at an upper portion of heat exchanger 2 absorbs ethylene while passing the heat exchanger 2.

The ethylene-containing gas is introduced into the heat exchanger 2 through the conduit 3 connected to a lower portion of the heat exchanger 2. The conduit 3 is connected to the lower portion of heat exchanger 2 on the heat-exchanger side, whereas the vinyl ester feed pipe 10 is connected to an upper portion of heat exchanger 2. The ethylene-containing gas contacts the vinyl ester from the opposite side by traveling upward inside the heat exchanger 2, allowing ethylene in the gas to dissolve in the vinyl ester.

The vinyl ester that has absorbed ethylene is introduced into the polymerization vessel 1 through the conduit 4. In the case of continuous production, ethylene circulates through the polymerization vessel 1, heat exchanger 2, and conduits 3 and 4. Because a part of ethylene discharges through the reaction liquid drain pipe 9 with the vinyl ester, ethylene is replenished through at least one of the conduits 5, 6, and 7 from an ethylene source connected to the polymerization vessel 1.

Cellulose Nanofiber (CNF)

An aqueous dispersion of the present disclosure comprises a CNF.

With an aqueous dispersion of the present disclosure comprising a CNF, a film prepared with the aqueous dispersion of the present disclosure can reduce a decrease of water resistance, tensile elastic modulus, and stress at break, or improve these properties, compared to a film prepared with an aqueous solution of ethylene-vinyl alcohol copolymer (A). This can be achieved without greatly decreasing strain at break. These effects are in contrast to a film prepared with an aqueous solution containing PVA and CNF, which involves a great reduction of strain at break compared to a film prepared with a PVA aqueous solution.

By comprising a CNF, an aqueous emulsion of the present disclosure shows excellent heatproof adhesive properties, and excellent water resistance in a coating.

The CNF contained in an aqueous dispersion and aqueous emulsion of the present disclosure has an average fiber diameter of preferably 1 nm or more, more preferably 3 nm or more, even more preferably 4 nm or more. Production is easier with these lower limits of average fiber diameter. The average fiber diameter is preferably 1,000 nm or less, more preferably 500 nm or less, even more preferably 400 nm or less. The preferred average fiber diameter may be 300 nm or less, 200 nm or less, or 100 nm or less. With these upper limits of average fiber diameter, an aqueous dispersion or aqueous emulsion of the present disclosure, when used to make a film, tends to provide even superior water resistance to the film. In the present disclosure, the average fiber diameter of CNF is a number average fiber diameter calculated by microscopy. For example, the number average fiber diameter can be determined by observing arbitrarily selected ten CNFs with a scanning electron microscope (SEM), and calculating the mean value of the fiber diameters of the ten CNFs after finding the fiber diameter of each CNF from the captured image (SEM image) using analysis software.

The CNF has an average fiber length of preferably 0.01 μm or more, more preferably 0.1 μm or more, even more preferably 0.2 μm or more. With these lower limits of average fiber length of CNF, an aqueous dispersion or aqueous emulsion of the present disclosure, when used to make a film, tends to more greatly improve the tensile elastic modulus and stress at break of the film. The CNF has an average fiber length of preferably 1,000 μm or less, more preferably 500 μm or less, even more preferably 100 μm or less, particularly preferably 50 μm or less. The preferred average fiber length may be 5 μm or less, or 2 μm or less. With these upper limits of average fiber length of CNF, an aqueous dispersion or aqueous emulsion of the present disclosure, when used to make a film, tends to be able to reduce a large decrease of strain at break in the film. With the foregoing upper limits of average fiber length, an aqueous emulsion according to the present disclosure, when used to make a film, tends to provide even superior water resistance to the film. In the present disclosure, the average fiber length of CNF is a number average fiber length calculated by microscopy. For example, the number average fiber length can be determined by observing arbitrarily selected ten CNFs with a scanning electron microscope (SEM), and calculating the mean value of the fiber lengths of the ten CNFs after finding the fiber length of each CNF from the captured image (SEM image) using analysis software.

The aspect ratio of CNF, which is the ratio of average fiber length to average fiber diameter, is preferably 3 or more, more preferably 10 or more, even more preferably 50 or more. With these lower limits of aspect ratio of CNF, an aqueous dispersion or aqueous emulsion of the present disclosure, when used to make a film, tends to more greatly improve the tensile elastic modulus and stress at break of the film.

A fibrillated cellulose fiber can preferably be used as CNF, for example. The material of the fibrillated cellulose fiber may be, for example, wood, straw, bamboo, bagasse, bamboo leaf, common reed, or rice husk. Fibrillation may be achieved by mechanically applying a shear force to cellulose fibers with a device such as a beating machine or a homogenizer. It is also possible to fibrillate cellulose fibers by chemical treatment. The CNF may contain lignin. Lignin is a component contained in the raw materials of fibrillated cellulose fibers. The lignin content can be adjusted by adjusting the removal rate of lignin during fibrillation. The CNF may be modified with an anionic group (e.g., a carboxyl group) or a cationic group, or may be unmodified. A certain preferred embodiment is, for example, an aqueous dispersion in which the CNF is an unmodified CNF. Another preferred embodiment is, for example, an aqueous emulsion in which the CNF is an unmodified CNF.

Aqueous Dispersion

In the present disclosure, "aqueous dispersion" refers to a dispersion of CNF in a medium containing water. The water content of the medium is preferably 40 mass % or more, more preferably 70 mass % or more, even more preferably 90 mass % or more, particularly preferably 95 mass % or more, and may be 100 mass %. The medium may contain an organic solvent. The content of organic solvent is preferably 60 mass % or less, more preferably 30 mass % or less, even more preferably 10 mass % or less, particularly preferably 5 mass % or less.

In an aqueous dispersion of the present disclosure, it is preferable that the ethylene-vinyl alcohol copolymer (A) be dissolved either partly or entirely. More preferably, essentially all the ethylene-vinyl alcohol copolymer (A) is dissolved.

The CNF content in an aqueous dispersion of the present disclosure is preferably 0.1 parts or more by mass, more preferably 0.2 parts or more by mass, even more preferably 0.3 parts or more by mass, particularly preferably 0.5 parts or more by mass with respect to 100 parts by mass of ethylene-vinyl alcohol copolymer (A). The preferred CNF content may be 1 part or more by mass, 2 parts or more by mass, or 3 parts or more by mass. With these lower limits of CNF content, an aqueous dispersion of the present disclosure, when used to make a film, more greatly improves the water resistance, tensile elastic modulus, and stress at break of the film. With the foregoing lower limits of CNF content, a coating agent constituted of an aqueous dispersion of the present disclosure can provide a coated paper that exhibits even superior waterproofing strength and solvent barrier properties, and even superior oil resistance even when folded, or a multilayer structure having even superior gas barrier properties even when folded. The CNF content in an aqueous dispersion of the present disclosure is preferably 40 parts or less by mass, more preferably 30 parts or less by mass, even more preferably 25 parts or less by mass with respect to 100 parts by mass of ethylene-vinyl alcohol copolymer (A). The preferred CNF content may be 20 parts or less by mass, 15 parts or less by mass, 13 parts or less by mass, 10 parts or less by mass, or 8 parts or less by mass. With these upper limits of CNF content, the tensile elastic modulus tends to improve even more greatly, and a large decrease of strain at break tends to be reduced. A coating agent constituted of an aqueous dispersion of the present disclosure quickly dries when coated, and has a moderate viscosity. This makes the coating agent even more suitable for production of a coated paper or a multilayer structure. A multilayer structure prepared with the coating agent shows even superior gas barrier properties after being placed under a bending load.

The total content of the ethylene-vinyl alcohol copolymer (A) and CNF in an aqueous dispersion of the present disclosure is preferably 0.1 mass % or more, more preferably 0.5 mass % or more, even more preferably 1 mass % or more, particularly preferably 1.5 mass % or more. The preferred total content may be 2 mass % or more, 2.5 mass % or more, or 3 mass % or more. With these lower limits of total content of ethylene-vinyl alcohol copolymer (A) and CNF, it is easier to produce a film with an aqueous dispersion of the present disclosure. The total content of the ethylene-vinyl alcohol copolymer (A) and CNF in an aqueous dispersion of the present disclosure is preferably 30 mass % or less, more preferably 27 mass % or less, even more preferably 23 mass % or less, particularly preferably 20 mass % or less. The preferred total content may be 17 mass % or less, 15 mass % or less, 13 mass % or less, 10 mass % or less, or 8 mass % or less. With these upper limits of total content of ethylene-vinyl alcohol copolymer (A) and CNF, a moderate viscosity can be maintained for easy handing of the aqueous dispersion.

The total content of the ethylene-vinyl alcohol copolymer (A) and CNF in solids contained in an aqueous dispersion of the present disclosure is preferably 55 mass % or more, more preferably 60 mass % or more, even more preferably 80 mass % or more. The preferred total content in solids may be 90 mass % or more, 95 mass % or more, 99 mass % or more, or 100 mass %. With these lower limits of total content of ethylene-vinyl alcohol copolymer (A) and CNF, a film prepared from an aqueous dispersion of the present disclosure can have even superior coating strength.

An aqueous dispersion of the present disclosure may comprise a component other than the ethylene-vinyl alcohol copolymer (A), CNF, or water, provided that such additional components do not interfere with the effects of the present disclosure. Examples of the additional components include additives such as resins other than ethylene-vinyl alcohol copolymer (A), organic solvents, plasticizers, cross-linking agents, surfactants, anti-settling agents, thickeners, fluidity improvers, preservatives, adhesion improving agents, antioxidants, penetrants, antifoaming agents, bulking agents, wetting agents, colorants, binders, water retention agents, fillers, sugars such as starch and derivatives thereof, and latexes. These may be used alone, or two or more thereof may be used in combination. The content of these components in an aqueous dispersion of the present disclosure is preferably 10 mass % or less. The preferred content may be 5 mass % or less, 2 mass % or less, 1 mass % or less, or 0.5 mass % or less. The content of the additional components in an aqueous dispersion of the present disclosure may be a content in the whole aqueous dispersion, or may be a content with respect to the solids contained in the aqueous dispersion, provided that the desired effect can be obtained. When the additional component is a resin other than the ethylene-vinyl alcohol copolymer (A), the resin content is preferably 60 mass % or less, more preferably 50 mass % or less. The preferred content may be 40 mass % or less, 30 mass % or less, 20 mass % or less, 10 mass % or less, or 5 mass % or less. Examples of resins other than the ethylene-vinyl alcohol copolymer (A) include a PVA containing essentially no ethylene unit (hereinafter, also referred to as "PVA (B)"), and a polymer (C) containing an ethylenically unsaturated monomer unit (described later).

The present disclosure includes an aqueous emulsion constituted of an aqueous dispersion of the present disclosure. Specifically, another embodiment according to the present disclosure is, for example, an aqueous emulsion comprising an ethylene-vinyl alcohol copolymer (A) and a CNF, the ethylene unit content of the ethylene-vinyl alcohol copolymer (A) being 1 mol % or more and less than 20 mol %.

The method of production of an aqueous dispersion of the present disclosure is not particularly limited. For example, an aqueous dispersion of the present disclosure can be produced by (i) a method that adds and disperses a CNF in an aqueous solution of ethylene-vinyl alcohol copolymer (A), (ii) a method that prepares an aqueous dispersion of CNF in water, and mixes the aqueous dispersion with an aqueous solution of ethylene-vinyl alcohol copolymer (A), or (iii) a method that adds an ethylene-vinyl alcohol copolymer (A) to an aqueous dispersion of CNF in water. Preferred is (i) or (ii) in view of reducing the insoluble part of ethylene-vinyl alcohol copolymer (A), and more evenly dispersing CNF.

In method (i) or (ii), the step of dispersing CNF, or the step of mixing an aqueous dispersion of CNF and an aqueous solution of ethylene-vinyl alcohol copolymer (A) may use, for example, a medium agitation disperser, a high-pressure disperser, or a rotary disperser.

Aqueous Emulsion

An aqueous emulsion of the present disclosure comprises an ethylene-vinyl alcohol copolymer (A) as a dispersant; a polymer (C) as a dispersoid; and a CNF, and the content of the cellulose nanofiber is 0.1 to 40 parts by mass with respect to 100 parts by mass of the ethylene-vinyl alcohol copolymer (A).

The polymer (C) is a polymer containing an ethylenically unsaturated monomer unit. Examples of the ethylenically unsaturated monomer include vinyl ester monomers, olefin monomers, (meth)acrylic acid and salts thereof, (meth)acrylic acid ester monomers (monofunctional (meth)acrylic acid ester monomers, polyfunctional (meth)acrylic acid ester monomers), (meth)acrylamide monomers, vinyl ether monomers, nitrile monomers, allyl monomers, α,β-unsaturated monocarboxylic or dicarboxylic acid monomers, diene monomers, aromatic vinyl monomers (for example, styrene monomers, condensed polycyclic aromatic monomers), and heterocyclic vinyl monomers. Preferred is at least one selected from the group consisting of a vinyl ester monomer, a (meth)acrylic acid ester monomer, a styrene monomer, and a diene monomer. More preferred are vinyl ester monomers. These may be used alone, or two or more thereof may be used in combination. In the present disclosure, "(meth)acryl" means one or more selected from the group consisting of acryl and methacryl.

Examples of the vinyl ester monomers include vinyl acetate, vinyl formate, vinyl propionate, vinyl butyrate, vinyl isobutyrate, vinyl pivalate, vinyl versatate, vinyl cinnamate, vinyl crotonate, vinyl decanoate, vinyl hexanoate, vinyl octanoate, vinyl isononanoate, vinyl trimethylacetate, vinyl 4-tert-butylbenzoate, vinyl 2-ethylhexanoate, vinyl caproate, vinyl caprylate, vinyl laurate, vinyl palmitate, vinyl stearate, vinyl oleate, and vinyl benzoate. Preferred is vinyl acetate from an industry standpoint.

Examples of the olefin monomers include ethylene and propylene.

Examples of (meth)acrylic acid and salts thereof include acrylic acid, methacrylic acid, and sodium salts and potassium salts of these.

Examples of the monofunctional (meth)acrylic acid ester monomers include (meth)acrylic acid and salts thereof, methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate, and octadecyl (meth)acrylate.

Examples of the polyfunctional (meth)acrylic acid ester monomers include pentaerythritol tri(meth)acrylate, pentaerythritol tetra(meth)acrylate, pentaerythritol hexa(meth)acrylate, and trimethylolpropane tri(meth)acrylate.

Examples of the (meth)acrylamide monomers include (meth)acrylamide, N-methyl(meth)acrylamide, N-ethyl(meth)acrylamide, N,N-dimethyl(meth)acrylamide, diacetone(meth)acrylamide, (meth)acrylamidopropanesulfonic acid and salts thereof, (meth)acrylamidopropyldimethylamine and salts or quaternary salts thereof, and N-methylol (meth)acrylamide and derivatives thereof.

Examples of the vinyl ether monomers include methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether.

Examples of the nitrile monomers include acrylonitrile and methacrylonitrile.

Examples of the allyl monomers include allyl acetate and allyl chloride.

Examples of the α,β-unsaturated monocarboxylic or dicarboxylic acid monomers include aliphatic unsaturated dicarboxylic acids such as maleic acid, itaconic acid, and fumaric acid, and salts or esters thereof.

Examples of the diene monomers include butadiene, isoprene, and chloroprene.

Examples of the aromatic vinyl monomers include styrene monomers such as styrene, α-methylstyrene, p-methylstyrene, chlorostyrene, α-butoxystyrene, 1-ethyl-2-vinylbenzene, and vinylbiphenyl; and condensed polycyclic aromatic monomers such as vinylnaphthalene. Preferred are styrene monomers.

Examples of the heterocyclic vinyl monomers include N-vinyl-2-pyrrolidone.

The content of the ethylenically unsaturated monomer unit with respect to all the monomer units of polymer (C) is preferably 70 mass % or more. The preferred content may be 80 mass % or more, 90 mass % or more, or 95 mass % or more, or may be 100 mass %. With these lower limits of ethylenically unsaturated monomer unit content, the ethylene-vinyl alcohol copolymer (A) exhibits even superior emulsion polymerization stability.

The CNF content in an aqueous emulsion of the present disclosure is preferably 0.15 parts or more by mass, more preferably 0.2 parts or more by mass, even more preferably 0.3 parts or more by mass, particularly preferably 0.5 parts or more by mass with respect to 100 parts by mass of ethylene-vinyl alcohol copolymer (A). The preferred content may be 1 part or more by mass, 2 parts or more by mass, 3 parts or more by mass, or 5 parts or more by mass. With these lower limits of CNF content, an aqueous emulsion of the present disclosure exhibits even superior heatproof adhesive properties, and even superior water resistance in a coating. The CNF content in an aqueous emulsion according to the present disclosure is preferably 38 parts or less by mass, more preferably 35 parts or less by mass with respect to 100 parts by mass of ethylene-vinyl alcohol copolymer (A). The preferred content may be 30 parts or less by mass, 25 parts or less by mass, or 20 parts or less by mass. With these upper limits of CNF content, an aqueous emulsion of the present disclosure exhibits even superior heatproof adhesive properties, and even superior water resistance in a coating.

The total content of the ethylene-vinyl alcohol copolymer (A) and CNF in an aqueous emulsion of the present disclosure is preferably 2 parts or more by mass, more preferably 2.5 parts or more by mass, even more preferably 3 parts or more by mass with respect to 100 parts by mass of polymer (C). The preferred total content may be 4 parts or more by mass, or 5 parts or more by mass. With these lower limits of total content of ethylene-vinyl alcohol copolymer (A) and CNF, an aqueous emulsion of the present disclosure exhibits even superior heatproof adhesive properties. The total content of the ethylene-vinyl alcohol copolymer (A) and CNF in an aqueous emulsion of the present disclosure is preferably 35 parts or less by mass, more preferably 30 parts or less by mass, even more preferably 25 parts or less by mass with respect to 100 parts by mass of polymer (C). With these upper limits of total content of ethylene-vinyl alcohol copolymer (A) and CNF, an aqueous emulsion of the present disclosure exhibits even superior water resistance in a coating.

The solids concentration in the aqueous emulsion is preferably 10 to 80 mass %. With a solids concentration of 10 mass % or more, the viscosity of the aqueous emulsion does not become overly low, and particle sedimentation is less likely to occur. The solids concentration is more preferably 15 mass % or more. The preferred solids concentration may be 20 mass % or more, 25 mass % or more, 30 mass % or more, 35 mass % or more, or 40 mass % or more. With a solids concentration of 80 mass % or less, formation of aggregates is less likely to occur during emulsion polymerization, and production is easier. The solids concentration is more preferably 75 mass % or less. The preferred solids concentration may be 70 mass % or less, 65 mass % or less, or 60 mass % or less. Here, "solids" means the total amount of dry solids present in the aqueous emulsion, or the total amount of solids remaining after the removal of a medium such as water.

The total content of the ethylene-vinyl alcohol copolymer (A), polymer (C), and CNF in solids contained in an aqueous emulsion of the present disclosure is preferably 55 mass % or more, more preferably 60 mass % or more, even more preferably 80 mass % or more. The preferred total content may be 90 mass % or more, 95 mass % or more, 99 mass % or more, or 100 mass %. The coating strength improves with these lower limits of total content of the ethylene-vinyl alcohol copolymer (A), polymer (C), and CNF.

The dispersant may additionally comprise a PVA containing essentially no ethylene unit (hereinafter, also referred to as "PVA (B)"). The preferred viscosity-average degree of polymerization and the preferred degree of saponification of PVA (B) are the same as in the preferred embodiment of ethylene-vinyl alcohol copolymer (A) described above. The PVA (B) may be an unmodified PVA or a modified PVA. Example of the modified PVA include anion-modified PVAs such as sulfonic acid group-modified PVAs, and carboxylic acid group-modified PVAs; cation-modified PVAs such as quaternary amine group-modified PVAs; amide-modified PVAs; polyoxyalkylene group-modified PVAs; acetoacetyl group-modified PVAs; and diacetone acrylamide-modified PVAs.

The water content in a medium of an aqueous emulsion of the present disclosure is preferably 40 mass % or more, more preferably 70 mass % or more, even more preferably 90 mass % or more, particularly preferably 95 mass % or more. The preferred content may be 100 mass %. The medium may contain an organic solvent. The organic solvent content is preferably 60 mass % or less, more preferably 30 mass % or less, even more preferably 10 mass % or less, particularly preferably 5 mass % or less.

An aqueous emulsion of the present disclosure may comprise components other than the ethylene-vinyl alcohol copolymer (A), polymer (C), CNF, or water, provided that such additional components do not interfere with the effects of the present disclosure. Examples of such additional components include additives such as resins other than ethylene-vinyl alcohol copolymer (A) or polymer (C), organic solvents, plasticizers, cross-linking agents, surfactants, anti-settling agents, thickeners, fluidity improvers, preservatives, adhesion improving agents, antioxidants, penetrants, antifoaming agents, bulking agents, wetting agents, colorants, binders, water retention agents, fillers, sugars such as starch and derivatives thereof, and latexes. These may be used alone, or two or more thereof may be used in combination. The content of these components in an aqueous emulsion according to the present disclosure is preferably 15 mass % or less, more preferably 10 mass % or less. The preferred content may be 5 mass % or less, 2 mass % or less, 1 mass % or less, or 0.5 mass % or less.

Method of Production of Aqueous Emulsion

The present disclosure provides a method for producing an aqueous emulsion of the present disclosure An aqueous emulsion production method of the present disclosure is preferably a method that comprises a step (1) of polymerizing an ethylenically unsaturated monomer by emulsion polymerization in the presence of an ethylene-vinyl alcohol copolymer (A) to obtain an aqueous emulsion (hereinafter, also referred to simply as "CNF-free aqueous emulsion"), and a step (2) of adding a CNF to the aqueous emulsion, or a method that comprises a step (3) of obtaining an aqueous dispersion containing an ethylene-vinyl alcohol copolymer (A) and a CNF; and a step (4) of mixing the aqueous dispersion with an ethylenically unsaturated monomer to allow emulsion polymerization.

Preferably, the step (2) is performed by a process that adds and mixes an aqueous dispersion of CNF into the CNF-free aqueous emulsion obtained in step (1). Preferably, the step (3) is performed by a process that adds and disperses a CNF in an aqueous solution of ethylene-vinyl alcohol copolymer (A), a process that mixes an aqueous solution of ethylene-vinyl alcohol copolymer (A) and an aqueous dispersion of CNF, a process that dissolves an ethylene-vinyl alcohol copolymer (A) in an aqueous dispersion of CNF, or a process that adds an ethylene-vinyl alcohol copolymer (A) and CNF to water at once to dissolve the ethylene-vinyl alcohol copolymer (A) and disperse the CNF at the same time. The aqueous dispersion used as the starting raw material in step (2) and step (3) contains a CNF. In addition to CNF and water, the aqueous dispersion may contain the same additional components presented above as optional components of an aqueous emulsion according to the present disclosure, in the amounts given above. In these processes, the CNF-containing aqueous dispersion may be obtained by, for example, mixing water and CNF, and dispersing CNF with a device such as a medium agitation disperser, a high-pressure disperser, or a rotary disperser.

The ethylenically unsaturated monomer used in step (1) and step (4) may be any of the ethylenically unsaturated monomers exemplified above as the ethylenically unsaturated monomer contained in the polymer (C).

In step (1), the aqueous emulsion may be obtained by, for example, adding an appropriately selected polymerization initiator after charging the dispersant and the ethylenically unsaturated monomer, and polymerizing the monomer by emulsion polymerization. The method used to charge or add the dispersant is not particularly limited. For example, the dispersant may be charged early at once, or may be continuously added during polymerization. In view of increasing the graft rate of the ethylene-vinyl alcohol copolymer (A) and the optional PVA (B) into the dispersoid, it is preferable to charge the dispersant into the polymerization system early at once. In these methods, the polymerization reaction can be regulated by appropriately adjusting the amount of dispersant, the amount of ethylenically unsaturated monomer, and the amount of solvent.

In step (4), emulsion polymerization may be carried out by a process that adds an ethylenically unsaturated monomer and an appropriately selected polymerization initiator to the aqueous dispersion obtained in step (3), and polymerizing the monomer by emulsion polymerization. In this method, the polymerization reaction can be regulated by appropriately adjusting the amount of dispersant, the amount of ethylenically unsaturated monomer, and the amount of solvent.

The dispersant is used in an amount of preferably 2 parts by mass to 35 parts by mass with respect to 100 parts by mass of polymer (C), though the amount of dispersant is not particularly limited. The amount of dispersant is more preferably 2.5 parts or more by mass. The preferred amount may be 3 parts or more by mass, 4 parts or more by mass, or 5 parts or more by mass. With these lower limits of dispersant amount, the emulsion polymerization reaction tends to stably proceed. The amount of dispersant is more preferably 30 parts or less by mass. The preferred amount may be 25 parts or less by mass, 20 parts or less by mass, or 15 parts or less by mass. With these upper limits of dispersant amount, the aqueous emulsion, when used as an adhesive agent, tends to provide excellent heatproof adhesive properties to the adhesive agent. In the present disclosure, almost all monomers polymerize into the polymer (C) in producing an aqueous emulsion by emulsion polymerization of monomers in the presence of a dispersant. Accordingly, only small amounts of monomer remain in the aqueous emulsion, and the amount of remaining monomer is negligible.

The polymerization initiator used in the emulsion polymerization may be a water-soluble single initiator or a water-soluble redox initiator commonly used for emulsion polymerization. Such polymerization initiators may be used alone, or two or more thereof may be used in combination. Preferred are redox initiators.

Examples of the water-soluble single initiator include azo initiators, and peroxides such as hydrogen peroxide and persulfates (such as potassium persulfate, sodium persulfate, and ammonium persulfate). Examples of the azo initiators include 2,2'-azobis(isobutyronitrile), 2,2'-azobis(2,4-dimethylvaleronitrile), and 2,2'-azobis(4-methoxy-2,4-dimethylvaleronitrile).

The redox initiator may be an initiator combining an oxidant and a reductant. The oxidant is preferably a peroxide. Examples of the reductant include metal ions and reducing compounds. Examples of the combination of an oxidant and a reductant include: a combination of a peroxide and a metal ion; a combination of a peroxide and a reducing compound; and a combination of a peroxide, a metal ion, and a reducing compound. Examples of the peroxide include: hydrogen peroxide; hydroperoxides such as cumene hydroperoxide and t-butyl hydroperoxide; persulfates (potassium persulfate, sodium persulfate, and ammonium persulfate); t-butyl peroxyacetate; and peresters (t-butyl peroxybenzoate). Examples of the metal ion include metal ions capable of undergoing a single-electron transfer, for example, such as $Fe^{2+}$, $Cr^{2+}$, $V^{2+}$, $Co^{2+}$, $Ti^{3+}$, and $Cu^{+}$. Examples of the reducing compound include sodium hydrogen sulfite, sodium hydrogen carbonate, tartaric acid, fructose, dextrose, sorbose, inositol, rongalite, and ascorbic acid. Preferred among these is a combination of at least one oxidant selected from the group consisting of hydrogen peroxide, potassium persulfate, sodium persulfate, and ammonium persulfate, and at least one reductant selected from the group consisting of sodium hydrogen sulfite, sodium hydrogen carbonate, tartaric acid, rongalite, and ascorbic acid. More preferred is a combination of hydrogen peroxide and at least one reductant selected from the group consisting of sodium hydrogen sulfite, sodium hydrogen carbonate, tartaric acid, rongalite, and ascorbic acid.

For emulsion polymerization, for example, an alkali metal compound, a surfactant, a buffering agent, or a polymerization degree adjuster may be used appropriately, provided that it does not hinder the effects of the present disclosure.

The alkali metal compound is not particularly limited, as long as an alkali metal (sodium, potassium, rubidium, or cesium) is contained, and may be an alkali metal ion itself, or a compound containing an alkali metal. Specific examples of the compound containing an alkali metal include weakly basic alkali metal salts, for example, such as alkali metal carbonates, alkali metal acetates, alkali metal bicarbonates, alkali metal phosphates, alkali metal sulfates, alkali metal halides, and alkali metal nitrates; and strongly basic alkali metal compounds, for example, such as alkali metal hydroxides and alkali metal alkoxides. These alkali metal compounds may be used alone, or two or more thereof may be used in combination.

Examples of the weakly basic alkali metal salts include alkali metal carbonates, for example, such as sodium carbonate, potassium carbonate, rubidium carbonate, and cesium carbonate; alkali metal bicarbonates, for example, such as sodium hydrogen carbonate and potassium hydrogen carbonate; alkali metal phosphates, for example, such as sodium phosphate and potassium phosphate; alkali metal carboxylates, for example, such as sodium acetate, potassium acetate, and cesium acetate; alkali metal sulfates, for example, such as sodium sulfate, potassium sulfate, and cesium sulfate; alkali metal halides, for example, such as cesium chloride, cesium iodide, potassium chloride, and sodium chloride; and alkali metal nitrates, for example, such as sodium nitrate, potassium nitrate, and cesium nitrate. In view of imparting basicity to the emulsion, preferred are alkali metal carboxylates, alkali metal carbonates, and alkali metal bicarbonates, which can act as weakly acidic and strongly basic salts when dissociated. More preferred are alkali metal carboxylates. By using weakly basic alkali metal salts such as above, these alkali metal salts act as a pH buffer in emulsion polymerization, allowing the emulsion polymerization to stably proceed.

The content of alkali metal compound (in terms of an alkali metal) can be appropriately selected depending on the type of the alkali metal compound used. The content of alkali metal compound (in terms of an alkali metal) is preferably 100 to 15,000 ppm, more preferably 120 to 12,000 ppm, even more preferably 150 to 8,000 ppm with respect to the total mass of the aqueous emulsion (in terms of solids). With 100 ppm or more of alkali metal compound, the stability of the emulsion polymerization of the aqueous emulsion tends to improve, whereas staining is less likely to occur in a coating made with the aqueous emulsion when the content of alkali metal compound is 15,000 ppm or less. The content of alkali metal compound can be measured with a device such as an ICP emission spectrometer. Here, "ppm" means ppm by mass.

The surfactant may be any of a non-ionic surfactant, an anionic surfactant, and a cationic surfactant. Examples of the non-ionic surfactant include polyoxyethylene alkyl ethers, polyoxyethylene alkyl phenyl ethers, polyoxyethylene fatty acid esters, polyoxyalkylene alkyl ethers, polyoxyethylene derivatives, sorbitan fatty acid esters, polyoxyethylene sorbitan fatty acid esters, polyoxyethylene sorbitol fatty acid esters, and glycerin fatty acid esters. Examples of the anionic surfactant include alkyl sulfates, alkylaryl sulfates, alkyl sulfonates, sulfates of hydroxy alkanols, dialkyl sulfosuccinates, and sulfates and phosphates of alkyl or alkylaryl polyethoxy alkanols. Examples of the cationic surfactant include alkylamine salts, quaternary ammonium salts, and polyoxyethylene alkylamines. The amount of the surfactant used is preferably 2 mass % or less with respect to the total amount of the ethylenically unsaturated monomer. With the surfactant used in an amount of 2 mass % or less, the aqueous emulsion, when used to make a coating, provides even superior water resistance to the coating.

Examples of the buffering agent include: acids such as acetic acid, hydrochloric acid, and sulfuric acid; bases such as ammonia, amine, caustic soda, caustic potash, and calcium hydroxide; and alkali carbonates, phosphates, and acetates. Examples of the polymerization degree adjuster include mercaptans and alcohols.

The dispersion medium in the emulsion polymerization is preferably an aqueous medium based on water. The aqueous medium based on water may contain a water-soluble organic solvent (such as alcohol or ketone) that can freely dissolve in water. The term "aqueous medium based on water" as used herein refers to a dispersion medium containing 50 mass % or more of water. In terms of cost and environmental burden, the dispersion medium is preferably an aqueous medium containing 90 mass % or more of water, and is more preferably water. In the method of producing an aqueous emulsion, it is preferable to dissolve and heat the dispersant in the dispersion medium before starting emulsion polymerization, and cool the resultant mixture before purging it with nitrogen. Here, the heating temperature is preferably 80 to 100° C. The temperature of emulsion polymerization is preferably about 20 to 95° C., more preferably about 40 to 90° C.

An aqueous emulsion of the present disclosure can preferably be used as an adhesive agent. That is, the present disclosure discloses an adhesive agent constituted of an aqueous emulsion of the present disclosure. The adhesive agent can be used in applications such as woodworking and paper processing. An aqueous emulsion of the present disclosure is applicable to a wide range of applications, including, for example, paints, fiber processing, binders for inorganic substances, cement admixtures, and mortar primers. An aqueous emulsion of the present disclosure also can be used in the form of a powder, or a powder emulsion as it is called, after, for example, spray drying.

Film

The present disclosure also provides a film formed of an aqueous dispersion or aqueous emulsion of the present disclosure. The film thickness is not particularly limited, and is preferably 10 μm or more, more preferably 20 μm or more, even more preferably 30 μm or more, and is preferably 1,000 μm or less, more preferably 500 μm or less, even more preferably 200 μm or less.

The film can be produced by, for example, cast deposition, coating, wet deposition, or gel deposition. In producing a film by cast deposition, drying with heated air may result in a film with dry surfaces, and cause problems such as uneven drying and air entrainment. It is accordingly preferable to cast and dry an aqueous dispersion of the present disclosure into a film on a glass plate or a plastic film such as a polyethylene terephthalate (hereinafter, also referred to with the abbreviation "PET") film. The drying conditions are not particularly limited. For example, the film may be dried at 10 to 40° C. under 30 to 80% RH for 6 hours to 2 weeks. A film obtained by using such a production method is a film comprising an ethylene-vinyl alcohol copolymer (A), a CNF, and, optionally, a polymer (C). The film may be a gas barrier film.

Coating Agent

An aqueous dispersion and aqueous emulsion of the present disclosure can also be used as a coating agent (i.e., a coating liquid). That is, the present disclosure provides a coating agent constituted of an aqueous dispersion or aqueous emulsion of the present disclosure. The substrate to be coated with a coating agent of the present disclosure is not particularly limited, and may be, for example, a paper, or a substrate containing a resin. The coating agent may use an aqueous dispersion or aqueous emulsion of the present disclosure by itself, or additional components may be added. Examples of such additional components include those presented above as additional components other than the ethylene-vinyl alcohol copolymer (A), CNF, or water. Other examples of the additional components include:

- waterproofing agents such as glyoxal, urea resins, melamine resins, polyvalent metal salts, and water-soluble polyamide resins;
- pH adjusters such as ammonia, caustic soda, sodium carbonate, and phosphoric acid;
- release agents;
- colorants such as pigments;
- unmodified PVAs, and various modified PVAs such as carboxy-modified PVAs, sulfonic acid group-modified PVAs, acrylamide-modified PVAs, cationic group-modified PVAs, and long-chain alkyl group-modified PVAs;
- water-soluble polymers such as casein, raw starch (wheat, corn, rice, potato, sweet potato, tapioca, sago), decomposed products of raw starch (e.g., dextrin), starch derivatives (e.g., oxidized starch, etherified starch, esterified starch, and cationized starch), seaweed polysaccharides (e.g., sodium alginate, carrageenan, agar (agarose, agaropectin), and furcellaran), and derivatives of water-soluble cellulose (e.g., carboxyalkyl cellulose, alkyl cellulose, and hydroxyalkyl cellulose); and
- synthetic resin emulsions such as styrene-butadiene copolymer latexes, polyacrylic acid ester emulsions, vinyl acetate-ethylene copolymer emulsions, and vinyl acetate-acrylic acid ester copolymer emulsions.

Paper Coating Agent

A coating agent of the present disclosure may be a paper coating agent (i.e., a coating liquid for paper).

The concentration of the ethylene-vinyl alcohol copolymer (A) in a paper coating agent can be freely selected according to conditions such as the amount of coating (an increase in the dry mass of paper as a result of coating), the device used for coating, and the procedural conditions. The concentration of ethylene-vinyl alcohol copolymer (A) is preferably 1.0 to 30 mass %, more preferably 2.0 to 25.0 mass %.

A paper coating agent of the present disclosure can be coated on paper using a known method, for example, a method that applies the paper coating agent to one side or both sides of paper with a device such as a size press, a gate roll coater, a sym sizer, a bar coater, or a curtain coater, or a method that impregnates paper with a coating liquid for paper. The paper after coating can be dried using a known method, for example, a method that uses heated air, infrared rays, or a heated cylinder, or a combination of these. The coated paper after drying can exhibit improved barrier properties when humidified or calendered. Preferably, calendering is performed with a roll temperature ranging from ordinary temperature to 100° C., and a roll line pressure of 20 to 300 kg/cm.

Another embodiment of the present disclosure is, for example, a coated paper comprising a paper, wherein the paper is coated with a paper coating agent of the present disclosure. A coated paper using a paper coating liquid of the present disclosure can be used as, for example, a release paper base, a greaseproof paper, a gas barrier paper, a thermal paper, an inkjet paper, or a pressure-sensitive paper. Preferably, a coated paper using a paper coating liquid of the present disclosure is used as a release paper base or a greaseproof paper. That is, the present disclosure provides the coated paper as a release paper base or a greaseproof paper.

The release paper base has a sealing layer (barrier layer) formed of the paper coating liquid on a substrate (paper). Examples of the substrate (paper) include paperboard such as manila board, white-lined chipboard, and liners; and printing paper such as common wood-free paper, wood-containing paper, and gravure paper. The release paper has a release layer laminated on the sealing layer of the release paper base. Preferably, the release layer is constituted of silicone resin. Examples of the silicone resin include known silicone resins, for example, such as solvent-based silicone, solventless silicone, and emulsion silicone. The amount of the coating in the release paper base (an increase in the dry mass of paper as a result of coating) is not particularly limited, and is, for example, 0.1 to 2.0 g/m$^2$.

The greaseproof paper has an oilproof layer formed of the paper coating liquid on a substrate (paper). Examples of the substrate (paper) include paperboard such as manila board, white-lined chipboard, and liners; printing paper such as common wood-free paper, wood-containing paper, and gravure paper; and kraft paper, glassine paper, and parchment paper. The amount of the coating in the greaseproof paper (an increase in the dry mass of paper as a result of coating) is not particularly limited, and is, for example, 0.1 to 20 g/m$^2$.

Multilayer Structure

Another embodiment according to the present disclosure is, for example, a multilayer structure comprising a substrate containing a resin, wherein the substrate is coated with a coating agent of the present disclosure. The multilayer structure has a layer (1) formed of a coating agent of the present disclosure, and a layer (2) representing a resin-containing substrate.

The layer (1) comprises an ethylene-vinyl alcohol copolymer (A) and a CNF. The total content of the ethylene-vinyl alcohol copolymer (A) and CNF in the layer (1) is preferably 50 mass % or more, more preferably 80 mass % or more, even more preferably 95 mass % or more, and may be 100 mass %.

The resin contained in the layer (2) is preferably at least one selected from a polyolefin resin, a polyester resin, and a polyamide resin.

Examples of the polyolefin resin include polyethylene [e.g., high-density polyethylene (HDPE), low-density polyethylene (LDPE), linear low-density polyethylene (LLDPE), very low-density polyethylene (VLDPE)], polypropylene, copolymer polypropylene, an ethylene-vinyl acetate copolymer, and an ethylene-(meth)acrylic acid ester copolymer. Preferred are polyethylene and polypropylene.

Examples of the polyester resin include PET, polyethylene naphthalate, polybutylene terephthalate, and polyethylene terephthalate/isophthalate. Preferred is PET.

Examples of the polyamide resin include homopolymers such as polycaproamide (nylon-6), polyundecaneamide (nylon-11), polylauryllactam (nylon-12), polyhexamethylene adipamide (nylon-6,6), and polyhexamethylene sebacamide (nylon-6,12); and copolymers such as a caprolactam/lauryllactam copolymer (nylon-6/12), a caprolactam/aminoundecanoic acid polymer (nylon-6/11), a caprolactam/w-aminononanoic acid polymer (nylon-6,9), a caprolactam/hexamethylene diammonium adipate copolymer (nylon-6/6,6), a caprolactam/hexamethylene diammonium adipate/hexamethylene diammonium sebacate copolymer (nylon-6/6,6/6,12), a polymer of adipic acid and m-xylylenediamine, and aromatic nylon (a polymer of hexamethylenediamine and m,p-phthalic acid). Preferred are polycaproamide (nylon-6) and polyhexamethylene adipamide (nylon-6,6).

The content of the polyolefin resin, polyester resin, and polyamide resin in the layer (2) is preferably 50 mass % or more, more preferably 80 mass % or more, even more preferably 95 mass % or more, and may be 100 mass %.

The layer (1) has a thickness of preferably 0.01 μm or more, more preferably 0.1 μm or more. The thickness of layer (1) is preferably 100 μm or less, more preferably 50 μm or less. The preferred thickness may be 20 μm or less, or 9 μm or less. The layer (2) has a thickness of preferably 5 to 100 μm. The thickness ratio of layer (1) to layer (2) is preferably 0.9 or less, more preferably 0.5 or less. The thickness ratio is preferably 0.01 or more. When the film is stretched, the thickness means the final thickness.

The layer (1) and layer (2) may contain an inorganic laminar compound to improve gas barrier properties, strength, or ease of handling. Examples of the inorganic laminar compound include mica, talc, montmorillonite, kaolinite, and vermiculite. These may be naturally occurring compounds, or may be synthetic.

The layer (1) and layer (2) may contain a cross-linking agent to improve water resistance. Examples of the cross-linking agent include epoxy compounds, isocyanate compounds, aldehyde compounds, titanium compounds, silica compounds, aluminum compounds, zirconium compounds, and boron compounds. Preferred are silica compounds, such as colloidal silica and alkyl silicate.

A multilayer structure of the present disclosure may have an adhesive component layer between layer (1) and layer (2) to improve adhesive properties. Examples of such adhesive components include anchor coating agents. The adhesive component layer can be formed by, for example, applying the adhesive component to a surface of the substrate before coating the substrate with the aqueous dispersion.

A multilayer structure of the present disclosure may additionally include a heat seal resin layer on the surface of layer (1) not in contact with the layer (2). Normally, the heat seal resin layer is formed by extrusion lamination or dry lamination. Examples of the heat seal resin include polyethylene resins such as HDPE, LDPE, and LLDPE, polypropylene resins, an ethylene-vinyl acetate copolymer, an ethylene-α-olefin random copolymer, and ionomer resins.

A multilayer structure of the present disclosure can be produced by, for example, applying an aqueous dispersion of the present disclosure to a surface of a substrate formed of a resin other than the ethylene-vinyl alcohol copolymer (A) and contained in the layer (2), and removing the medium of the aqueous dispersion. The temperature of the aqueous dispersion at coating is preferably 20 to 80° C. The coating method is preferably gravure roll coating, reverse gravure coating, reverse roll coating, or wire bar coating. The substrate before coating with the aqueous dispersion, or the multilayer structure produced may be subjected to drawing or heat treatment. Considering the ease of procedure, it is preferable to apply the aqueous dispersion to the substrate after the first drawing, and perform a heat treatment during or after the subsequent second drawing. The heat treatment is carried out in air, for example. The heat treatment temperature may be adjusted according to the type of substrate. The heat treatment temperature is typically 140° C. to 170° C. in the case of a polyolefin film, and 140° C. to 240° C. in the case of a polyester film and a polyamide film. When subjected to a heat treatment, the layer (1) is typically heat treated simultaneously with the layer (2).

A multilayer structure of the present disclosure can be used as a gas barrier film. The gas barrier film can be used as a packing material. That is, another embodiment according to the present disclosure is, for example, a packing material comprising a multilayer structure of the present disclosure. The packing material is usable for packing of, for example, food products; drinks; chemicals such as agrichemicals and pharmaceuticals; medical devices; industrial materials such as machinery components and delicate materials; or garments. The packing material is particularly preferable in applications where oxygen barrier properties are needed, and in applications where inside of the packing material is displaced with various functional gases. Examples of different forms of the packing material include a vertical form-fill-seal bag, a vacuum packaging bag, a pouch with a spout, a laminated tube container, and a lid material for containers.

Adhesive Agent

An aqueous dispersion and aqueous emulsion of the present disclosure can also be used as an adhesive agent. That is, another embodiment according to the present disclosure is, for example, an adhesive agent comprising an aqueous dispersion or aqueous emulsion of the present disclosure. The adhesive agent may use an aqueous dispersion or aqueous emulsion of the present disclosure by itself, or additional components may be added. Examples of such additional components include those presented above as additional components other than the ethylene-vinyl alcohol copolymer (A), polymer (C), CNF, or water. In some cases, it may be preferable to add a plasticizer or a cross-linking agent.

Examples of the plasticizer include dicarboxylic acid ester compounds and aryloxy-containing compounds.

Examples of the dicarboxylic acid ester compound include 2,2,4-trimethyl-1,3-pentanediol diisobutyrate, methyl adipate, dimethyl succinate, dimethyl glutarate, dibutyl phthalate, diphenyl phthalate, dihexyl phthalate, dicyclohexyl phthalate, dehydroabietyl phthalate, and dimethyl isophthalate.

Examples of the aryloxy group of the aryloxy-containing compounds include a phenoxy group and a substituted phenoxy group. Examples of the substituted phenoxy group include C1 to C12 alkoxyphenoxy groups and C1 to C12 alkylphenoxy groups. The number of substituents is preferably, but not limited to, 1 to 5, more preferably 1 to 3. A substituted or unsubstituted phenoxy-containing compound is preferred as the aryloxy-containing compound, and more preferred is a substituted or unsubstituted phenoxy-containing compound containing no vinyl group. Specific examples of the aryloxy-containing compound include phenoxyethanol, ethylene glycol monophenyl ether, polypropylene glycol monophenyl ether, polyoxyethylene nonylphenyl ether, and polyoxyethylene dinonylphenyl ether. The plasticizer may be used alone, or two or more thereof may be used in combination.

The plasticizer content is preferably 0.5 to 20 parts by mass, more preferably 1.0 to 10 parts by mass with respect to 100 parts by mass of solids in the aqueous dispersion or aqueous emulsion. With the plasticizer content falling in these ranges, an adhesive agent having even superior adhesive properties can be obtained.

Examples of the crosslinking agent include polyisocyanate compounds; hydrazine compounds; polyamidoamine epichlorohydrin resin (PAE); water-soluble aluminum salts such as aluminum chloride and aluminum nitrate; and glyoxal resins such as urea-glyoxal resins.

The polyisocyanate compounds are compounds having two or more isocyanate groups within the molecule. Examples of the polyisocyanate compounds include tolylene diisocyanate (TDI), hydrogenated TDI, trimethylolpropane-TDI adduct (e.g., Desmodur L; Bayer AG), triphenylmethane triisocyanate, methylene bisphenyl isocyanate (MDI), polymethylene polyphenyl polyisocyanate (PMDI), hydrogenated MDI, polymeric MDI, hexamethylene diisocyanate (HDI), xylylene diisocyanate (XDI), 4,4-dicyclohexylmethane diisocyanate, and isophorone diisocyanate (IPDI). The polyisocyanate compound used may be a prepolymer resulting from polymerization of a polyol with excess polyisocyanate and having a terminal group containing an isocyanate group.

The hydrazine compounds are compounds having a hydrazino group ($H_2N$—NH—) within the molecule. Examples of the hydrazine compounds include:

hydrazine, hydrazine hydrate, hydrazine salts of inorganic acids such as hydrochloric acid, sulfuric acid, nitric acid, sulfurous acid, phosphoric acid, thiocyanic acid, and carbonic acid, and hydrazine salts of organic acids such as formic acid and oxalic acid;

monosubstituted hydrazines such as methylhydrazine, ethylhydrazine, propylhydrazine, butylhydrazine, and allylhydrazine; and symmetrically disubstituted hydrazines such as 1,1-dimethylhydrazine,1,1-diethylhydrazine, and (1-butyl-2-methylhydrazine).

It is also possible to use conventionally known hydrazine compounds, including, for example, polyhydrazide compounds such as oxalic acid dihydrazide, malonic acid dihydrazide, succinic acid dihydrazide, adipic acid dihydrazide, azelaic acid dihydrazide, sebacic acid dihydrazide, dodecanedioic acid dihydrazide, maleic acid dihydrazide, fumaric acid dihydrazide, diglycolic acid dihydrazide, tartaric acid dihydrazide, malic acid dihydrazide, isophthalic acid dihydrazide, terephthalic acid dihydrazide, and dimer acid dihydrazide. Preferred is adipic acid dihydrazide. The cross-linking agent may be used alone, or two or more thereof may be used in combination.

The content of the cross-linking agent is preferably 1 to 50 parts by mass with respect to 100 parts by mass of polymer (C). Superior water resistance and heat resistance can be obtained with 1 part or more by mass of cross-linking agent. With 50 parts or less by mass of cross-linking agent, it is easier to form a desirable coating, and superior water resistance and heat resistance can be obtained.

The adherend of the adhesive agent may be, for example, paper, wood, or plastic. The adherend is preferably wood. An adhesive agent of the present disclosure shows high adhesive properties for conifers, which are rich in resin, and for broad-leaf trees, which have dense grains. This makes an adhesive agent of the present disclosure usable in applications such as bonded wood, plywood, coated plywood, and fiberboard. An adhesive agent of the present disclosure is also suitable as an adhesive agent for paper, particularly paper straws.

Uses

Aside from the uses mentioned above, an aqueous dispersion and aqueous emulsion of the present disclosure also have other applications. The following are non-limiting examples of other uses.

(1) Vinyl chloride dispersants: dispersion stabilizers and dispersion aids for suspension polymerization of vinyl chloride and vinylidene chloride (2) Coating agents: sizing agents, textile processing agents, leather finishing agents, paints, anti-fogging agents, metal corrosion inhibitors, gloss agents for zinc plating, and antistatic agents (3) Adhesive agents and binders: adhesive agents, pressure sensitive adhesives, remoistening adhesives, various binders, and additives for cements and mortars (4) Dispersion stabilizers: dispersion stabilizers for organic and inorganic pigments of paints and adhesive agents, dispersion stabilizers for emulsion polymerization of various vinyl compounds, and post-emulsifiers for substances such as bitumen (5) paper processing: paper strength enhancers, oil- and solvent-resistance imparting agents, smoothness improving agents, auxiliary agents for surface gloss improvement, sealing agents, barrier agents, lightfastness imparting agents, waterproofing agents, dispersants for dyes and color-developing agents, adhesion improving agents, and binders (6) Agriculture: agrichemical binders, agrichemical spreading agents, agricultural coating agents, soil improvers, erosion preventing agents, and agrichemical dispersants (7) Medicine and cosmetics: granulating binders, coating agents, emulsifiers, patches, binders, film formulation bases, and film-forming agents (8) Viscosity adjusters: thickeners, rheology adjusters (9) flocculants: flocculants for suspended matter or dissolved matter in water, and metal flocculants

(10) films: water-soluble films, polarizing films, barrier films, textile wrapping films, seedling protecting sheets, vegetation sheets, seed tapes, and hygroscopic films

(11) Molded products: fibers, films, sheets, pipes, tubes, leak-proof films, water-soluble fibers for chemical laces, and sponges

(12) Resin raw materials: raw materials for polyvinyl butyral, raw materials of photosensitive resins, raw materials of graft polymers, and raw materials of various gels.

(13) Post-reactions: post-reactions with low-molecular organic compounds, high-molecular organic compounds, and inorganic compounds The present disclosure encompasses embodiments combining the foregoing features in various forms within the technical idea of the present disclosure, provided that the present disclosure can produce its effects.

EXAMPLES

The following describes the present disclosure in greater detail. In the following, "part(s)" and "%" mean "part(s) by mass" and "mass %", respectively, unless otherwise specifically stated.

It is to be noted that "part(s)" and "%" mean part(s) by mass and mass %, respectively, unless otherwise specifically stated.

Ethylene Unit Content of Ethylene-Vinyl Alcohol Copolymer (A)

The ethylene unit content of ethylene-vinyl alcohol copolymer (A) was determined by $^1$H-NMR measurement of an ethylene-modified vinyl ester polymer, a precursor or a re-acetified product of ethylene-vinyl alcohol copolymer (A). Specifically, a specimen of the ethylene-modified vinyl ester polymer of each Example and Comparative Example was purified by reprecipitation at least 3 times with a mixed solution of n-hexane and acetone, and was dried at 80° C. for 3 days under reduced pressure to prepare an ethylene-modified vinyl ester polymer for analysis. The ethylene-modified vinyl ester polymer so prepared for analysis was dissolved in DMSO-$d_6$, and a $^1$H-NMR measurement (500 MHz) was conducted at 80° C. with an NMR spectrometer. The ethylene unit content was calculated from a peak (integration value P: 4.7 to 5.2 ppm) derived from the methine proton on the backbone of vinyl acetate, and peaks (integration value Q: 1.0 to 1.6 ppm) derived from the methylene protons on the backbones of ethylene and vinyl acetate, using the following formula.

$$\text{Ethylene unit content(mol \%)}=100\times((Q-2P)/4)/P$$

Viscosity-Average Degree of Polymerization of Vinyl Alcohol Polymer

The viscosity-average degree of polymerization of the vinyl alcohol polymer (ethylene-vinyl alcohol copolymer (A), or a PVA containing no ethylene unit) was measured according to JIS K 6726:1994. Specifically, the vinyl alcohol polymer was saponified to a degree of saponification of 99.5 mol % or more when the vinyl alcohol polymer had a degree of saponification of less then 99.5 mol %, and the viscosity-average degree of polymerization (P) was determined for the vinyl alcohol polymer using the following formula with a limiting viscosity [η] (liter/g) measured in water at 30° C.

$$P=([\eta]\times10^4/8.29)^{(1/0.62)}$$

Degree of Saponification of Vinyl Alcohol Polymer

The degree of saponification of the vinyl alcohol polymer (ethylene-vinyl alcohol copolymer (A), or a PVA containing no ethylene unit) was determined by the method described in JIS K 6726:1994.

Production Example 1

FIG. 1 shows a schematic diagram of the polymerizer used. Ethylene was introduced into a substantially cylindrical polymerization vessel 1 [capacity: 7 kl, vessel inner diameter D: 1.8 m] equipped with an impeller 8 [a Maxblend impeller manufactured by Sumitomo Heavy Industries Process Equipment Co., Ltd.; impeller diameter (diameter) d: 1 m, impeller (paddle) width b: 2 m] through the conduit 5 until the ethylene pressure in the vessel reached 0.47 MPa. Through the conduit 6, a 1 mass % methanol solution of polymerization initiator 2,2'-azobis-(4-methoxy-2,4-dimethylvaleronitrile) was introduced at a rate of 2.5 L/hr. A vinyl acetate-containing solution (vinyl acetate: 820 L/hr, methanol: 128 L/hr) was introduced into the polymerization vessel 1 through the feed pipe 10 and heat exchanger 2. From the polymerization vessel 1, the ethylene-containing gas was introduced into the heat exchanger 2 through the conduit 3. For continuous polymerization with ethylene, the vinyl acetate-containing solution flows down along the pipe surface and absorbs ethylene, and mixes into the reaction liquid by flowing into the polymerization vessel 1 through the conduit 4. The polymer solution was continuously drained through the drain pipe 9 to maintain the liquid level constant in the polymerization vessel 1. The polymerization conversion rate of vinyl acetate was adjusted to make the polymerization conversion rate 28% at the exit of polymerization vessel 1. The agitation power Pv per unit volume was 3 kW/$m^3$, and the Froude number Fr was adjusted to 0.11. The reaction liquid was agitated with the impeller (paddle) being completely immersed in the reaction liquid, and with the upper end of the impeller (paddle) being adjacent to the liquid level. The reaction liquid had a dwell time of 5 hours in the polymerization vessel. The temperature at the exit of the polymerization vessel was 60° C. Methanol vapor was introduced into the continuously drained polymer solution to remove the unreacted vinyl acetate monomer, and obtain a methanol solution of ethylene-vinyl acetate copolymer (30 mass % concentration).

To the methanol solution of ethylene-vinyl acetate copolymer (30 mass % concentration) obtained in the polymerization step was added a methanol solution of saponification catalyst sodium hydroxide (4 mass % concentration) at a mole ratio of 0.011 (a mole ratio of sodium hydroxide to the vinyl acetate unit in the ethylene-vinyl acetate copolymer). After mixing the ethylene-vinyl acetate copolymer solution and the saponification catalyst solution with a static mixer, the resultant mixture was placed on a belt, and was maintained at 40° C. for 18 minutes to allow a saponification reaction to proceed. The reaction product was then pulverized and dried to obtain an ethylene-vinyl alcohol copolymer (1). The copolymer (1) had an ethylene unit content of 4.0 mol %, a viscosity-average degree of polymerization of 1,700, a degree of saponification of 98.0 mol %, and a block character of the ethylene unit of 0.92.

The agitation power Pv per unit volume (kW/$m^3$) was calculated using the following formula.

$$Pv=(Pt-Pe)/v$$

Here, Pt is the agitation power (kW) in polymerization reaction, Pe is the agitation power (kW) under no load (an empty polymerization vessel), and V is the amount of polymerization solution ($m^3$) in polymerization vessel. Pe and Pt in the formula were calculated from the current value (A) and voltage value (V) of the agitator, as follows.

$$Pe(\text{or } Pt)=3^{1/2}\times\text{voltage value}\times\text{current value}\times\text{power factor}\times\text{efficiency}/1{,}000$$

Froude number Fr was calculated using the following formula.

$$Fr=n^2\times d/g,$$

where n represents the rotational speed (rps) of the impeller, d the impeller diameter (m), and g the gravitational acceleration (m/$s^2$).

Block Character of Ethylene Unit of Ethylene-Vinyl Alcohol Copolymer

The ethylene-vinyl alcohol copolymer was saponified to a degree of saponification of 99.9 mol % or more. After being thoroughly washed with methanol, the ethylene-vinyl alcohol copolymer was dried at 90° C. for 2 days under reduced pressure, and was dissolved in DMSO-$d_6$ before taking a $^{13}$C-NMR measurement (500 MHz) at 80° C. By using the formula below, the block character (η) of ethylene unit was determined using the molar fraction (AE) of the diad of vinyl alcohol and ethylene, the molar fraction (A) of vinyl alcohol unit, and the molar fraction (E) of ethylene unit, after determining signals and calculating these mole fractions from the spectrum chart according to the method described in T. Moritani and H. Iwasaki, Vol. 11, No. 6, pp. 1251-1259, Macromolecules (1978).

$$\eta=(AE)/\{2\times(A)\times(E)\}$$

Production Examples 2 to 4

Ethylene-vinyl alcohol copolymers (2) to (4) were produced in the same manner as in Production Example 1, except that the amounts of ethylene, vinyl acetate, methanol, and initiator fed for polymerization, and the polymerization conversion rate, the agitation power Pv, the Froude number Fr, and the concentration of ethylene-vinyl ester copolymer solution and the mole ratio of sodium hydroxide in saponification were varied as shown in Table 1.

Production Example 5

An ethylene-vinyl alcohol copolymer (5) was produced in the same manner as in Production Example 1, except that the amounts of ethylene, vinyl acetate, methanol, and initiator fed for polymerization, and the polymerization conversion rate, the agitation power Pv per unit volume, the Froude number Fr, the method used to supply vinyl acetate, and the concentration of ethylene-vinyl ester copolymer solution and the mole ratio of sodium hydroxide in saponification were varied as shown in Table 1, and that a double pitched-paddle impeller [impeller diameter (diameter) d: 1.5 m, impeller (paddle) width b: 0.88 m] was used as impeller 8. It is to be noted here that the double pitched-paddle impeller does not classify as a wide-paddle impeller because of the small impeller (paddle) width b.

Production Example 6

An ethylene-vinyl alcohol copolymer (6) was produced in the same manner as in Production Example 1, except that the amounts of ethylene, vinyl acetate, methanol, and initiator fed for polymerization, and the polymerization conversion rate, the agitation power Pv per unit volume, the Froude number Fr, and the concentration of ethylene-vinyl ester copolymer solution and the mole ratio of sodium hydroxide in saponification were varied as shown in Table 1, and that an anchor impeller [impeller diameter (diameter) d: 1.7 m, impeller (paddle) width b: 0.85 m] was used as impeller 8. It is to be noted here that the anchor impeller does not classify as a wide-paddle impeller because of the small impeller (paddle) width b.

dry coating formed thereon. The dry coating was peeled off from the coated product to obtain a 50 μm-thick film. The film was immersed in 20° C. water for 20 hours, and was measured for degree of swelling and percentage dissolution. Smaller values of degree of swelling and percentage dissolution mean that the film has superior water resistance. The results are presented in Table 2.

Degree of swelling (fold change)=(mass of sample after immersion in water)/(mass of sample dried after immersion in water)

Percentage dissolution (mass %)=[{dry mass of sample before immersion in water)−(dry mass of sample after immersion in water)}/(dry mass of sample before immersion in water)]×100

Measurement of Strength and Elongation of Film

A 50 μm-thick film was obtained using the same method used for the measurement of degree of swelling and percentage dissolution. The film was cut into 10 mm widths, and humidified for 1 week at 20° C., 65% RH. The film was then subjected to a strength and elongation measurement using a precision universal testing machine (Autograph AG-IS, manufactured by Shimadzu Corporation) with a chuck distance of 50 mm and a pull rate of 100 mm/min to determine the tensile elastic modulus, the strain at break, and the stress at break. The measurement was conducted 5 times

TABLE 1

| | | Polymerization conditions | | | | | | | | | Saponification conditions | |
|---|---|---|---|---|---|---|---|---|---|---|---|---|
| | Copolymer | Ethylene MPa | Vinyl acetate L/hr | Methanol L/hr | Initiator L/hr | Polymerization conversion rate % | Impeller — | Agitation power Pv kW/m$^3$ | Froude number Fr — | Vinyl acetate supply — | PVAc concentration Mass % | NaOH Mole ratio |
| Production Example 1 | Copolymer (1) | 0.47 | 820 | 128 | 2.5 | 28 | Maxblend impeller | 3 | 0.11 | Heat exchanger | 30 | 0.011 |
| Production Example 2 | Copolymer (2) | 0.69 | 682 | 188 | 82.6 | 68 | Maxblend impeller | 2 | 0.1 | Heat exchanger | 45 | 0.015 |
| Production Example 3 | Copolymer (3) | 0.28 | 620 | 232 | 83.2 | 70 | Maxblend impeller | 1.9 | 0.1 | Heat exchanger | 45 | 0.015 |
| Production Example 4 | Copolymer (4) | 0.9 | 870 | 95 | 2.2 | 26 | Maxblend impeller | 2.9 | 0.09 | Heat exchanger | 28 | 0.011 |
| Production Example 5 | Copolymer (5) | 0.47 | 820 | 128 | 2.5 | 28 | Double pitched-paddle impeller | 2 | 0.18 | Direct | 30 | 0.011 |
| Production Example 6 | Copolymer (6) | 1.77 | 735 | 174 | 41 | 50 | Anchor impeller | 1.8 | 0.17 | Heat exchanger | 40 | 0.03 |

Example I-1

One-hundred parts by mass of ethylene-vinyl alcohol copolymer (1) was dissolved in 2,150 parts by mass of water to prepare a 4 mass % aqueous solution of ethylene-vinyl alcohol copolymer (1). To the aqueous solution was added 250 parts by mass of a 2 mass % aqueous dispersion of unmodified CNF (aspect ratio:about 200, average fiber diameter: 50 nm, average fiber length: 10 μm), and the mixture was stirred with a magnetic stirrer for 1 hour to obtain an aqueous dispersion. The CNF content in the aqueous dispersion was 5 parts by mass with respect to 100 parts by mass of ethylene-vinyl alcohol copolymer (1).

Measurement of Degree of Swelling and Percentage Dissolution of Film

The aqueous dispersion obtained in Example I-1 was cast on a PET film at 20° C., 65% RH, and was dried at room temperature for 7 days to obtain a coated product having a for each sample, and the mean value was determined. The results are presented in Table 3.

Examples I-2 to I-5

An aqueous dispersion was obtained in the same manner as in Example I-1, except that the type of ethylene-vinyl alcohol copolymer (A), and the CNF content were varied as shown in Table 2. The aqueous dispersion was used to prepare a film using the method described above, and the film was evaluated with respect to its degree of swelling, percentage dissolution, and strength and elongation. The results are presented in Tables 2 and 3.

Comparative Example I-1

A 4 mass % aqueous solution of ethylene-vinyl alcohol copolymer (1) was prepared in the same manner as in Example I-1. To the aqueous solution was added 250 parts by mass of water, and the mixture was stirred in the same manner as in Example I-1 to obtain an aqueous solution. The aqueous solution was used to prepare a film using the method described above, and the film was evaluated with respect to its degree of swelling, percentage dissolution, and strength and elongation. The results are presented in Tables 2 and 3.

Comparative Example I-2

An aqueous solution was obtained in the same manner as in Comparative Example I-1, except that the type of ethylene-vinyl alcohol copolymer (A) was changed as shown in Table 2. The aqueous solution was used to prepare a film by the method described above, and the film was evaluated with respect to its degree of swelling, percentage dissolution, and strength and elongation. The results are presented in Tables 2 and 3.

Comparative Examples I-3 to I-6

Aqueous dispersions were obtained in the same manner as in Example I-1, except that the PVAs containing no ethylene unit shown in Table 2 were used in place of the ethylene-vinyl alcohol copolymer (A), and that the CNF content was varied as shown in Table 2. The aqueous dispersions were used to prepare films using the method described above, and the films were each evaluated with respect to its degree of swelling, percentage dissolution, and strength and elongation. The results are presented in Tables 2 and 3.

Comparative Examples 1-7 and 1-8

Aqueous solutions were obtained in the same manner as in Comparative Example I-1 or 1-2, except that the PVAs containing no ethylene unit shown in Table 3 were used in place of the ethylene-vinyl alcohol copolymer (A). The aqueous solutions were used to prepare films using the method described above, and the films were each evaluated with respect to its strength and elongation. The results are presented in Table 3.

Comparative Example 1-9

Attempts were made to obtain an aqueous dispersion with the ethylene-vinyl alcohol copolymer (6) shown in Table 2, instead of using the ethylene-vinyl alcohol copolymer (1) of Example I-1. However, because the ethylene-vinyl alcohol copolymer (6) was insoluble in water, it was not possible to produce or evaluate an aqueous dispersion.

TABLE 2

| | Composition of aqueous dispersion | | | | | | | | Water resistance of coating | |
|---|---|---|---|---|---|---|---|---|---|---|
| | Vinyl alcohol polymer*1) | | | | | | | | | |
| | Type | Viscosity-average degree of polymerization | Degree of saponification (mol %) | Ethylene unit content (mol %) | Block character of ethylene unit | CNF Amount (parts by mass)*2) | Water Amount (parts by mass)*2) | Vinyl alcohol polymer + CNF Content (mass %)*3) | Degree of swelling (fold change) | Percentage dissolution (mass %) |
| Ex. I-1 | Copolymer (1) | 1700 | 98.0 | 4 | 0.92 | 5 | 2395 | 4.2 | 4.6 | 23.3 |
| Ex. I-2 | Copolymer (1) | 1700 | 98.0 | 4 | 0.92 | 30 | 2370 | 5.2 | 3.4 | 13.4 |
| Ex. I-3 | Copolymer (2) | 500 | 98.0 | 10 | 0.98 | 5 | 2395 | 4.2 | 2.6 | 13.8 |
| Ex. I-4 | Copolymer (2) | 500 | 98.0 | 10 | 0.98 | 30 | 2370 | 5.2 | 2.2 | 7.4 |
| Ex. I-5 | Copolymer (5) | 1700 | 98.0 | 4 | 0.76 | 5 | 2395 | 4.2 | 4.9 | 26.5 |
| Com. Ex. I-1 | Copolymer (1) | 1700 | 98.0 | 4 | 0.92 | 0 | 2400 | 4 | 9.7 | 39.9 |
| Com. Ex. I-2 | Copolymer (2) | 500 | 98.0 | 10 | 0.98 | 0 | 2400 | 4 | 3.0 | 19.0 |
| Com. Ex. I-3 | PVA (1) | 1700 | 98.0 | 0 | — | 5 | 2395 | 4.2 | 9.4 | 53.5 |
| Com. Ex. I-4 | PVA (1) | 1700 | 98.0 | 0 | — | 30 | 2370 | 5.2 | 5.7 | 40.4 |
| Com. Ex. I-5 | PVA (2) | 500 | 98.0 | 0 | — | 5 | 2395 | 4.2 | 12.0 | 73.5 |
| Com. Ex. I-6 | PVA (2) | 500 | 98.0 | 0 | — | 30 | 2370 | 5.2 | 6.8 | 59.6 |
| Com. Ex. I-9 | Copolymer (6) | — | — | 22 | 0.99 | Copolymer (6) was insoluble in water, preventing preparation of aqueous dispersion | | | | |

*1)Ethylene-vinyl alcohol copolymer (A) or PVA containing no ethylene unit

*2)Amount with respect to 100 parts by mass of vinyl alcohol polymer

*3)Total amount of vinyl alcohol polymer and CNF in aqueous dispersion

TABLE 3

| | Composition of aqueous dispersion | | | | | | | | Coating tensile test | | |
|---|---|---|---|---|---|---|---|---|---|---|---|
| | Vinyl alcohol polymer*1) | | | | | | | Vinyl alcohol polymer + CNF Content (mass %)*3) | | | |
| | Type | Viscosity-average degree of polymerization | Degree of saponification (mol %) | Ethylene unit content (mol %) | Block character of ethylene unit | CNF Amount (parts by mass)*2) | Water Amount (parts by mass)*2) | | Tensile elastic modulus (MPa) | Strain at break (%) | Stress at Break (MPa) |
| Ex. I-1 | Copolymer (1) | 1700 | 98.0 | 4 | 0.92 | 5 | 2395 | 4.2 | 683 | 163 | 35.5 |
| Ex. I-2 | Copolymer (1) | 1700 | 98.0 | 4 | 0.92 | 30 | 2370 | 5.2 | 538 | 148 | 58.4 |
| Ex. I-3 | Copolymer (2) | 500 | 98.0 | 10 | 0.98 | 5 | 2395 | 4.2 | 1,038 | 62.7 | 59.3 |
| Ex. I-4 | Copolymer (2) | 500 | 98.0 | 10 | 0.98 | 30 | 2370 | 5.2 | 976 | 53.9 | 71.3 |
| Ex. I-5 | Copolymer (5) | 1700 | 98.0 | 4 | 0.76 | 5 | 2395 | 4.2 | 657 | 145 | 33.2 |
| Com. Ex. I-1 | Copolymer (1) | 1700 | 98.0 | 4 | 0.98 | 0 | 2400 | 4 | 381 | 161 | 22.5 |
| Com. Ex. I-2 | Copolymer (2) | 500 | 98.0 | 10 | 0.98 | 0 | 2400 | 4 | 523 | 61.2 | 36.0 |
| Com. Ex. I-3 | PVA (1) | 1700 | 98.0 | 0 | — | 5 | 2395 | 4.2 | 569 | 143 | 37.1 |
| Com. Ex. I-4 | PVA (1) | 1700 | 98.0 | 0 | — | 30 | 2370 | 5.2 | 450 | 16.2 | 55.7 |
| Com. Ex. I-5 | PVA (2) | 500 | 98.0 | 0 | — | 5 | 2395 | 4.2 | 622 | 80.6 | 26.9 |
| Com. Ex. I-6 | PVA (2) | 500 | 98.0 | 0 | — | 30 | 2370 | 5.2 | 492 | 11.3 | 36.7 |
| Com. Ex. I-7 | PVA (1) | 1700 | 98.0 | 0 | — | 0 | 2400 | 4 | 358 | 220 | 19.8 |
| Com. Ex. I-8 | PVA (2) | 500 | 98.0 | 0 | — | 0 | 2400 | 4 | 477 | 143 | 25.7 |
| Com. Ex. I-9 | Copolymer (6) | — | — | 22 | 0.99 | Copolymer (6) was insoluble in water, preventing preparation of aqueous dispersion | | | | | |

*1)Ethylene-vinyl alcohol copolymer (A) or PVA containing no ethylene unit
*2)Amount with respect to 100 parts by mass of vinyl alcohol polymer
*3)Total amount of vinyl alcohol polymer and CNF in aqueous dispersion The films prepared from the aqueous dispersion of Comparative Example I-3 (5 parts by mass of CNF) and the aqueous dispersion of Comparative Example I-4 (30 parts by mass of CNF) showed improved tensile elastic modulus and stress at break compared to the film prepared from the aqueous solution of Comparative Example I-7 (0 part by mass of CNF). However, the strain at break was considerably low. The films prepared from the aqueous dispersions of Example I-1 (5 parts by mass of CNF) and Example I-2 (30 parts by mass of CNF) showed improved tensile elastic modulus and stress at break, and a decrease of strain at break was reduced, as compared with the film prepared from the aqueous solution of Comparative Example I-1 (0 part by mass of CNF).

It can be said that similar results occur when the type of vinyl alcohol polymer contained in the aqueous dispersion is changed. The films prepared from the aqueous dispersions of Comparative Example I-5 (5 parts by mass of CNF) and Comparative Example I-6 (30 parts by mass of CNF) showed improved tensile elastic modulus and stress at break compared to the films prepared from the aqueous solution of Comparative Example I-8 (0 part by mass of CNF). However, the strain at break was considerably low. The films prepared from the aqueous dispersions of Example I-3 (5 parts by mass of CNF) and Example I-4 (30 parts by mass of CNF) showed greatly improved tensile elastic modulus and stress at break, and a decrease of strain at break was reduced, as compared with the film prepared from the aqueous solution of Comparative Example I-2 (0 part by mass of CNF).

Example II-1

One-hundred parts by mass of ethylene-vinyl alcohol copolymer (1) was dissolved in 900 parts by mass of water to prepare a 10 mass % aqueous solution of ethylene-vinyl alcohol copolymer (1). To the aqueous solution was added 250 parts by mass of a 2 mass % aqueous dispersion of unmodified CNF (aspect ratio: about 200, average fiber diameter: 50 nm, average fiber length 10 μm). After adding 500 parts by mass of water, the mixture was stirred with a magnetic stirrer for 1 hour to obtain a coating agent. The coating agent had a CNF content of 5 parts by mass with respect to 100 parts by mass or ethylene-vinyl alcohol copolymer (1). The total content of ethylene-vinyl alcohol copolymer (1) and CNF in the coating agent was 6 mass %. The coating agent was evaluated using the methods described below. Production and evaluations of coated papers were carried out as follows. The results are presented in Table 4.

Production of Coated Paper for Release Paper Using Coating Agent

The coating agent obtained in Example II-1 was hand-coated on glassine paper having a basis weight of 64 gsm, using a wire bar (bar coater). The coating agent was then dried at 105° C. for 1 minute with a cylindrical rotary dryer to produce a coated paper. The coating agent was coated in an amount of 1.0 gsm (one side) in terms of an amount of solids. The coated paper was humidified at 20° C., 65% RH for 72 hours, and was measured for its physical properties.

Production of Coated Paper for Greaseproof Paper Using Coating Agent

The coating agent obtained in Example II-1 was hand-coated on PPC (Plain Paper Copier) paper (wood-free paper) having a basis weight of 70 gsm, using a wire bar. The coating agent was then dried at 105° C. for 1 minute with a cylindrical rotary dryer to produce a coated paper. The coating agent was coated in an amount of 3.0 gsm (one side) in terms of an amount of solids. The coated paper was humidified at 20° C., 65% RH for 72 hours, and was measured for its physical properties.

Roll Smudge Test with Coated Paper

The coated paper prepared using the procedures above was humidified at 40° C., 90% RH for 24 hours. After humidification, the coated paper had a water content of about 10%. With the water content being held at this value as closely as possible, the coated paper was passed through a cylindrical rotary dryer once, and the extent of transfer of the coated surface to the cylinder roll surface was observed. The results were evaluated on the basis of the following three categories.

Good: Almost no transfer of coated surface

Moderate: Some transfer of coated surface

Poor: Heavy transfer of coated surface

Waterproofing Strength Test with Coated Paper

About 0.1 g of 20° C. ion-exchange water was dropped on a surface of the coated paper. After rubbing the surface with fingers, the state of dissolution of the coating agent was observed. The results were evaluated on the basis of the following five categories.

5: Excellent waterproofing strength; no sliminess

4: Sliminess is present but no change in coating layer

3: Partial emulsification of coating agent

2: Complete emulsification of coating agent

1: Dissolution of coating agent

Evaluation for Release Paper Applications: Air Permeability Measurement

The air permeability of the coated paper was measured with an Oken-type smoothness and air permeability tester according to JIS P 8117:2009. The preferred air permeability is 35,000 sec or more.

Evaluation for Release Paper Applications: Toluene Barrier Test

Colored toluene (red) was applied (5×5 cm) to the coated surface of the coated paper, and the extent of bleeding to the back surface (uncoated surface) was observed (small red dots or complete staining of the toluene-applied surface). The results were evaluated according to the following criteria.

5: No dots on back surface

4: A few dots (1 or 2 dots) are present

3: Large number of dots are present (about 10 to 20% of the toluene-applied surface)

2: Staining in about 20 to 70% of the toluene-applied surface

1: Staining over the whole toluene-applied surface (about 70% or more)

Evaluation for Greaseproof Paper Applications: KIT Test, Folding KIT Test

A KIT test was conducted for flat and folded portions of the coated surface according to TAPPI No. T 559 cm-02. The coated paper was evaluated by visual inspection. A commercially available greaseproof paper using fluororesin has a kit value of typically 5 or more in its rating, and the paper does not pose a problem in normal use when it has an oil resistance with a grade of 5 or more. Accordingly, the preferred grade for the oil resistance of the coated paper is 5 or higher. In applications that require higher oil resistance, the grade is more preferably 7 or higher, even more preferably 10 or higher.

In the KIT test of folded portions, the coated paper was folded in half with the coated surface facing outside. The folded portion was then pressed down 0.7 mm over 1.0 mm width under the pressure of 2.5 kgf/cm$^2$·s to create a clean crease line. After unfolding the coated paper, the oil resistance at the folded portion was measured according to TAPPI No. T 559 cm-02. The measurement was made by visual inspection. Because the coated paper does not pose a problem when its oil resistance has a grade of 5 or higher also at the folded portion, the preferred grade of oil resistance at the folded portion is 5 or higher. In applications that require higher oil resistance, the grade is more preferably 7 or higher, even more preferably 10 or higher.

Examples II-2 to II-7

Coating agents were obtained in the same manner as in Example II-1, except that the type of ethylene-vinyl alcohol copolymer (A) and the CNF content were varied as shown in Table 4. The coating agents were evaluated using the methods described above. The coating agents were used to prepare coated papers, and the coated papers were evaluated by the methods described above. The results are presented in Table 4.

Comparative Examples II-1 to II-3

Coating agents were obtained in the same manner as Example II-1, except that the PVAs containing no ethylene unit shown in Table 1 were used in place of the ethylene-vinyl alcohol copolymer (1), and that the CNF content was varied as shown in Table 4. The coating agents were evaluated using the methods described above. The coating agents were used to prepare coated papers, and the coated papers were evaluated by the methods described above. The results are presented in Table 4.

Comparative Example II-4

A 10 mass % aqueous solution of PVA (1) was prepared in the same manner as in Example II-1, except that the PVA (1) containing no ethylene unit shown in Table 4 was used in place of the ethylene-vinyl alcohol copolymer (1). To the aqueous solution was added 750 parts by mass of water, and the mixture was stirred for 1 hour with a magnetic stirrer to obtain a coating agent. The coating agent was evaluated using the methods described above. The coating agent was used to prepare a coated paper, and the coated paper was evaluated by the methods described above. The results are presented in Table 4.

Comparative Example II-5

A 10 mass % aqueous solution of ethylene-vinyl alcohol copolymer (1) was prepared in the same manner as in Example II-1. To the aqueous solution was added 750 parts by mass of water, and the mixture was stirred for 1 hour with a magnetic stirrer to obtain a coating agent. The coating agent was evaluated using the methods described above. The coating agent was used to prepare a coated paper, and the coated paper was evaluated by the methods described above. The results are presented in Table 4.

Comparative Example II-6

Attempts were made to prepare a coating agent with the ethylene-vinyl alcohol copolymer (6) shown in Table 4, instead of using the ethylene-vinyl alcohol copolymer (1). However, because the ethylene-vinyl alcohol copolymer (6) was insoluble in water, it was not possible to prepare a coating agent. Accordingly, it was not possible to conduct an evaluation of a coating agent, or produce and evaluate a coated paper.

TABLE 4

| | Composition of coating agent | | | | | | |
|---|---|---|---|---|---|---|---|
| | Vinyl alcohol polymer*1) | | | | | | |
| | Type | Viscosity-average degree of polymerization | Degree of saponification (mol %) | Ethylene unit content (mol %) | Block character of ethylene unit | CNF Amount (parts by mass)*2) | Water Amount (parts by mass)*2) |
| Ex. II-1 | Copolymer (1) | 1700 | 98.0 | 4 | 0.92 | 5 | 1750 |
| Ex. II-2 | Copolymer (1) | 1700 | 98.0 | 4 | 0.92 | 15 | 1750 |
| Ex. II-3 | Copolymer (3) | 500 | 98.0 | 4 | 0.95 | 5 | 1750 |
| Ex. II-4 | Copolymer (3) | 500 | 98.0 | 4 | 0.95 | 30 | 1750 |
| Ex. II-5 | Copolymer (4) | 1700 | 98.0 | 10 | 0.98 | 5 | 1750 |
| Ex. II-6 | Copolymer (4) | 1700 | 98.0 | 10 | 0.98 | 15 | 1750 |
| Ex. II-7 | Copolymer (5) | 1700 | 98.0 | 4 | 0.76 | 5 | 1750 |
| Com. Ex. II-1 | PVA (1) | 1700 | 98.0 | 0 | — | 5 | 1750 |
| Com. Ex. II-2 | PVA (1) | 1700 | 98.0 | 0 | — | 30 | 1750 |
| Com. Ex. II-3 | PVA (2) | 500 | 98.0 | 0 | — | 5 | 1750 |
| Com. Ex. II-4 | PVA (1) | 1700 | 98.0 | 0 | — | 0 | 1750 |
| Com. Ex. II-5 | Copolymer (1) | 1700 | 98.0 | 4 | 0.92 | 0 | 1750 |
| Com. Ex. II-6 | Copolymer (6) | — | — | 22 | 0.99 | Copolymer (6) was insoluble in water, preventing preparation of coating agent and production of coated paper | |

| | Composition of coating agent Vinyl alcohol polymer + CNF Content (mass %)*3) | Coated paper | | Release paper | | Greaseproof paper | |
|---|---|---|---|---|---|---|---|
| | | Roll smudge test | Waterproofing strength | Air permeability (sec) | Toluene barrier properties | KIT test without folding | KIT test with folding |
| Ex. II-1 | 6.0 | Good | 5 | 100,000 or more | 5 | 12 | 10 |
| Ex. II-2 | 6.6 | Good | 5 | 95,000 | 5 | 10 | 10 |
| Ex. II-3 | 6.0 | Moderate | 4 | 71,000 | 5 | 10 | 8 |
| Ex. II-4 | 7.4 | Good | 5 | 57,000 | 4 | 10 | 8 |
| Ex. II-5 | 6.0 | Good | 5 | 100,000 or more | 5 | 10 | 10 |
| Ex. II-6 | 6.6 | Good | 5 | 90,000 | 5 | 10 | 10 |
| Ex. II-7 | 6.0 | Good | 4 | 72,000 | 4 | 10 | 8 |
| Com. Ex. II-1 | 6.0 | Moderate | 2 | 25,000 | 3 | 12 | 7 |
| Com. Ex. II-2 | 7.4 | Good | 3 | 18,000 | 3 | 10 | 7 |
| Com. Ex. II-3 | 6.0 | Poor | 1 | 3,300 | 1 | 10 | 6 |
| Com. Ex. II-4 | 5.7 | Poor | 1 | 7,000 | 2 | 12 | 3 |
| Com. Ex. II-5 | 5.7 | Poor | 2 | 34,000 | 3 | 12 | 5 |
| Com. Ex. II-6 | Copolymer (6) was insoluble in water, preventing preparation of coating agent and production of coated paper | | | | | | |

*1) Ethylene-vinyl alcohol copolymer (A) or PVA containing no ethylene unit
*2) Amount with respect to 100 parts by mass of vinyl alcohol polymer
*3) Total amount of vinyl alcohol polymer and CNF in coating agent The coated paper (Example II-1) prepared with the coating agent constituted of the aqueous dispersion containing ethylene-vinyl alcohol copolymer (A) and CNF produced a more desirable result in the roll smudge test, and showed superior air permeability, waterproofing strength, solvent barrier properties, and folding oil resistance in the release paper, compared to when the coating agent did not contain a CNF (Comparative Example II-5). The coating agent (Example II-1) constituted of the aqueous dispersion containing ethylene-vinyl alcohol copolymer (A) and CNF showed superior air permeability, waterproofing strength, solvent barrier properties, and folding oil resistance in the release paper compared to the coating agent (Comparative Example II-1) constituted of the aqueous dispersion containing an ethylene unit-free PVA and a CNF.

Example III-1

One-hundred parts by mass of ethylene-vinyl alcohol copolymer (1) was dissolved in 1,150 parts by mass of water to prepare an 8 mass % aqueous solution of ethylene-vinyl alcohol copolymer (1). To the aqueous solution was added 250 parts by mass of a 2 mass % aqueous dispersion of unmodified CNF (aspect ratio: about 200, average fiber diameter: 50 nm, average fiber length: 10 μm), and the mixture was stirred for 1 hour with a magnetic stirrer to obtain an aqueous dispersion. The aqueous dispersion had a CNF content of 5 parts by mass with respect to 100 parts by mass of the ethylene-vinyl alcohol copolymer (1).

Production of Multilayer Structure

An anchor coating agent (adhesive agent) was coated over an oriented polyethylene terephthalate (OPET) film (a substrate, or layer (2)) having a thickness of 15 μm to form an adhesive agent layer on a surface of the OPET film. The aqueous dispersion obtained above was then coated on the surface of the adhesive agent layer with a gravure coater at 40° C., and was dried at 120° C. to form a layer (1). To promote the reaction of the anchor coating agent, the film was additionally subjected to a heat treatment at 160° C. for 120 seconds. This produced a multilayer structure. The layer (1) had a thickness of 2 μm.

Oxygen Gas Barrier Properties

The multilayer structure obtained in Example III-1 was humidified for 5 days under 20° C., 85% RH conditions, and oxygen transmission rate X (cc/$m^2$·day·atm) was measured under the following conditions, using an oxygen transmission rate measurement device (MOCON OX-TRAN 2/21, manufactured by MOCON). The results are presented in Table 5.

Temperature: 20° C.
Humidity on oxygen supply side: 85% RH
Humidity on carrier gas side: 85% RH
Flow rate of carrier gas: 10 mL/min
Oxygen pressure: 1.0 atm
Carrier gas pressure: 1.0 atm Oxygen Gas Barrier Properties after Bending Loading The multilayer structure obtained in Example III-1 was placed under a bending load 3 times with a Gelbo flex tester, and oxygen transmission rate Y(cc/$m^2$·day·atm) was measured in the manner described above. The results are presented in Table 5.

Examples III-2 to III-5

A multilayer structure was obtained in the same manner as in Example III-1, except that the type of ethylene-vinyl alcohol copolymer (A) and the CNF content were varied as shown in Table 5. Table 5 shows the oxygen transmission rate X of the multilayer structure, and the oxygen transmission rate Y after bending loading.

Comparative Example III-1

An 8 mass % aqueous solution of ethylene-vinyl alcohol copolymer (1) was prepared in the same manner as in Example III-1. To the aqueous solution was added 250 parts by mass of water, and the mixture was stirred as in Example III-1 to obtain an aqueous solution. A multilayer structure was prepared in the same manner as in Example III-1, except that this aqueous solution was used. Table 5 shows the oxygen transmission rate X of the multilayer structure, and the oxygen transmission rate Y after bending loading.

Comparative Example III-2

An aqueous solution was obtained in the same manner as in Comparative Example III-1, except that the type of ethylene-vinyl alcohol copolymer (A) was changed as shown in Table 5. The aqueous solution was used to prepare a multilayer structure, using the method described above. Table 5 shows the oxygen transmission rate X of the multilayer structure, and the oxygen transmission rate Y after bending loading.

Comparative Examples III-3 to III-6

Aqueous dispersions were obtained in the same manner as in Example III-1, except that the PVAs containing no ethylene unit shown in Table 5 were used in place of the ethylene-vinyl alcohol copolymer (A), and that the CNF content was varied as shown in Table 5. Multilayer structures were prepared in the same manner as in Example III-1, except that these aqueous dispersions were used. Table 5 shows the oxygen transmission rates X of the multilayer structures, and the oxygen transmission rates Y after bending loading.

Comparative Examples III-7 and III-8

Aqueous solutions were obtained in the same manner as in Comparative Example III-1, except that the PVAs containing no ethylene unit shown in Table 5 were used in place of the ethylene-vinyl alcohol copolymer (A). These aqueous solutions were used to prepare multilayer structures, using the method described above. Table 5 shows the oxygen transmission rates X of the multilayer structures, and the oxygen transmission rates Y after bending loading.

Comparative Example III-9

Attempts were made to obtain a multilayer structure with the ethylene-vinyl alcohol copolymer (6) shown in Table 5, instead of using the ethylene-vinyl alcohol copolymer (1). However, because the ethylene-vinyl alcohol copolymer (6) was insoluble in water, it was not possible to prepare a coating agent, or produce and evaluate a multilayer structure.

TABLE 5

| | Composition of coating agent | | | | | | |
|---|---|---|---|---|---|---|---|
| | Vinyl alcohol polymer*1) | | | | | | |
| | Type | Viscosity-average degree of polymerization | Degree of saponification (mol %) | Ethylene unit content (mol %) | Block character of ethylene unit | CNF Amount (parts by mass)*2) | Water Amount (parts by mass)*2) |
| Ex. III-1 | Copolymer (1) | 1700 | 98.0 | 4 | 0.92 | 5 | 1395 |
| Ex. III-2 | Copolymer (1) | 1700 | 98.0 | 4 | 0.92 | 30 | 1370 |
| Ex. III-3 | Copolymer (2) | 500 | 98.0 | 10 | 0.98 | 5 | 1395 |
| Ex. III-4 | Copolymer (2) | 500 | 98.0 | 10 | 0.98 | 30 | 1370 |
| Ex. III-5 | Copolymer (5) | 1700 | 98.0 | 4 | 0.76 | 5 | 1395 |
| Com. Ex. III-1 | Copolymer (1) | 1700 | 98.0 | 4 | 0.92 | 0 | 1400 |
| Com. Ex. III-2 | Copolymer (2) | 500 | 98.0 | 10 | 0.98 | 0 | 1400 |
| Com. Ex. III-3 | PVA (1) | 1700 | 98.0 | 0 | — | 5 | 1395 |
| Com. Ex. III-4 | PVA (1) | 1700 | 98.0 | 0 | — | 30 | 1370 |
| Com. Ex. III-5 | PVA (2) | 500 | 98.0 | 0 | — | 5 | 1395 |
| Com. Ex. III-6 | PVA (2) | 500 | 98.0 | 0 | — | 30 | 1370 |
| Com. Ex. III-7 | PVA (1) | 1700 | 98.0 | 0 | — | 0 | 1400 |
| Com. Ex. III-8 | PVA (2) | 500 | 98.0 | 0 | — | 0 | 1400 |
| Com. Ex. III-9 | Copolymer (6) | — | — | 22 | 0.99 | Copolymer (6) was insoluble in water, | |

TABLE 5-continued

| | | | preventing preparation of coating agent and production of multilayer structure |
|---|---|---|---|
| | Composition of coating agent Vinyl alcohol | Multilayer structure | |
| | polymer + CNF Content (mass %)*3) | Oxygen transmission rate X (cc/m$^2$ · day · atm) | Oxygen transmission rate Y (cc/m$^2$ · day · atm) |
| Ex. III-1 | 7 | 43 | 121 |
| Ex. III-2 | 8.7 | 35 | 168 |
| Ex. III-3 | 7 | 23 | 153 |
| Ex. III-4 | 8.7 | 18 | 194 |
| Ex. III-5 | 7 | 53 | 142 |
| Com. Ex. III-1 | 6.7 | 72 | 332 |
| Com. Ex. III-2 | 6.7 | 56 | 525 |
| Com. Ex. III-3 | 7 | 125 | 183 |
| Com. Ex. III-4 | 8.7 | 107 | 355 |
| Com. Ex. III-5 | 7 | 103 | 261 |
| Com. Ex. III-6 | 8.7 | 91 | 434 |
| Com. Ex. III-7 | 6.7 | 231 | 753 |
| Com. Ex. III-8 | 6.7 | 185 | 887 |
| Com. Ex. III-9 | Copolymer (6) was insoluble in water, preventing preparation of coating agent and production of multilayer structure | | |

*1)Ethylene-vinyl alcohol copolymer (A) or PVA containing no ethylene unit

*2)Amount with respect to 100 parts by mass of vinyl alcohol polymer

*3)Total amount of vinyl alcohol polymer and CNF in coating agent

The coating agent (Example III-1) constituted of the aqueous dispersion containing ethylene-vinyl alcohol copolymer (A) and CNF showed superior oxygen gas barrier properties, particularly oxygen gas barrier properties after bending loading, compared to when the aqueous dispersion did not contain CNF (Comparative Example III-1). Similar results were obtained when the viscosity-average degree of polymerization and the ethylene unit content of ethylene-vinyl alcohol copolymer (A) were varied (Example III-3 vs. Comparative Example III-2). The coating agent (Example III-1) constituted of the aqueous dispersion containing ethylene-vinyl alcohol copolymer (A) and CNF showed superior oxygen gas barrier properties compared to the coating agent (Comparative Example III-3) constituted of the aqueous dispersion containing an ethylene unit-free PVA and a CNF.

Example IV-1

A 1-liter glass polymerization vessel equipped with a reflux condenser, a dropping funnel, a thermometer, and a nitrogen inlet was charged with 285 g of ion-exchange water, and was heated to 85° C. After adding 21.0 g of ethylene-vinyl alcohol copolymer (A) (viscosity-average degree of polymerization: 1,700, degree of saponification: 98 mol %, ethylene unit content: 4 mol %), the ethylene-vinyl alcohol copolymer (A) was dissolved by being agitated for 45 minutes. Thereafter, 0.3 g of sodium acetate was added, and mixed and dissolved. The resultant aqueous solution of copolymer was cooled, and purged with nitrogen, and was heated to 60° C. while being agitated at 200 rpm. After adding 2.4 g of a 20 mass % aqueous solution of tartaric acid and 3.2 g of a 5 mass % hydrogen peroxide solution in shots, 28 g of vinyl acetate was introduced to start polymerization. Completion of the initial polymerization (the remaining amount of vinyl acetate is less than 1%) was confirmed 30 minutes after the start of polymerization. Thereafter, 1 g of a 10 mass % aqueous solution of tartaric acid and 3.2 g of a 5 mass % hydrogen peroxide solution were added in shots, and 252 g of vinyl acetate was continuously added over 2 hours. The polymerization temperature was maintained at 80° C. to allow polymerization to proceed to completion. This was followed by addition of 7.4 parts by mass of a 5 mass % aqueous dispersion of unmodified cellulose nanofibers (aspect ratio: about 200, average fiber diameter: 50 nm, average fiber length: 10 μm) with respect to 100 parts by mass of the aqueous emulsion. The whole was then gently mixed and agitated with an anchor impeller to give an aqueous emulsion (Em-1).

Heatproof Adhesive Properties

The heatproof adhesive properties were evaluated in compliance with WATT'91 (DIN EN 14257:2019). The results are presented in Table 1.

Bonding Conditions

Adherend: Buna/buna (Japanese beech)

Spread: 200 g/m$^2$

Pressing conditions: 20° C., 2 hours, 0.7 N/mm$^2$ pressure

Aging conditions: 20° C., 1 week

Measurement Conditions

The specimen was left to stand in an 80° C. dryer for 1 hour, and, after taking the specimen out of the dryer, the bond strength (unit: N/mm$^2$) was measured while the specimen was still hot.

Water Resistance of Coating

The aqueous emulsion obtained in Example IV-1 was cast on a PET film at 20° C., 65% RH, and was dried at room temperature for 7 days to obtain a coated product having a dry coating formed thereon. The dry coating was peeled off from the coated product to obtain a 400 μm-thick coating. The coating was immersed in 20° C. water for 20 hours, and was measured for water absorbency and percentage dissolution using the formulae below. Smaller values of water absorbency and percentage dissolution mean that the coating has superior water resistance. The results are presented in Table 6.

Water absorbency (mass %)={(sample mass after immersion in water)/(mass of sample dried after immersion in water)×100}−100

Percentage dissolution (mass %)=[{(dry mass of sample before immersion in water)−(dry mass of sample after immersion in water)}/(dry mass of sample before immersion in water)]×100

Examples IV-2 to IV-5

Aqueous emulsions (Em-2 to Em-5) were obtained by performing polymerization and adding CNF in the same manner as in Example IV-1, except that the type and amount of ethylene-vinyl alcohol copolymer (A), and the amount of CNF were varied as shown in Table 6. The heatproof adhesive properties of the aqueous emulsions (Em-2 to Em-5), and the water resistance of the coatings were evaluated using the above methods. The results are presented in Table 6.

Comparative Example IV-1

An aqueous emulsion was obtained after polymerization performed in the same manner as in Example IV-1 except that the type and amount of ethylene-vinyl alcohol copolymer (A) were varied as shown in Table 6. The aqueous emulsion was directly used as aqueous emulsion (Em-A), without adding CNF. The heatproof adhesive properties of the aqueous emulsion (Em-A), and the water resistance of the coating were evaluated using the above methods. The results are presented in Table 6.

Comparative Example IV-2

An aqueous emulsion (Em-B) was obtained by performing polymerization and adding CNF in the same manner as in Example IV-1, except that the polyvinyl alcohol containing no ethylene unit shown in Table 6 was used in place of the ethylene-vinyl alcohol copolymer (A). The heatproof adhesive properties of the aqueous emulsion (Em-B), and the water resistance of the coating were evaluated using the above methods. The results are presented in Table 6.

Comparative Example IV-3

An aqueous emulsion (Em-C) was obtained by performing polymerization and adding CNF in the same manner as in Example IV-1, except that the type and amount of ethylene-vinyl alcohol copolymer (A), and the amount of CNF were varied as shown in Table 6. The heatproof adhesive properties of the aqueous emulsion (Em-C), and the water resistance of the coating were evaluated using the above methods. The results are presented in Table 6.

TABLE 6

| | Composition of aqueous emulsion | | | | | | | | Water resistance of coating | | Heatproof adhesive |
|---|---|---|---|---|---|---|---|---|---|---|---|
| | | Ethylene-vinyl alcohol copolymer (A) | | | | | | | | | |
| | Type | Viscosity-average degree of polymerization | Degree of saponification (mol %) | Ethylene unit content (mol %) | Polymer (C) | CNF (parts by mass)*1 | (A) + CNF (parts by mass)*2 | (A)/(C)/CNF | Water absorbency (mass %) | Percentage dissolution (mass %) | properties Adhesion (N/mm²) |
| Ex. IV-1 | Em-1 | 1700 | 98 | 4 | PVAc | 10.0 | 8.8 | 8/100/0.8 | 23.0 | 1.8 | 2.3 |
| Ex. IV-2 | Em-2 | 1700 | 98 | 4 | PVAc | 0.6 | 8.1 | 8/100/0.05 | 28.0 | 1.9 | 1.8 |
| Ex. IV-3 | Em-3 | 1000 | 99 | 7 | PVAc | 33.3 | 20.0 | 15/100/5 | 27.0 | 3.0 | 2.8 |
| Ex. IV-4 | Em-4 | 1700 | 93 | 2 | PVAc | 3.3 | 3.1 | 3/100/0.1 | 24.0 | 2.0 | 1.2 |
| Ex. IV-5 | Em-5 | 500 | 98 | 10 | PVAc | 20.0 | 12.0 | 10/100/2 | 21.0 | 1.7 | 1.6 |
| Com. Ex. IV-1 | Em-A | 1700 | 93 | 2 | PVAc | 0.0 | 6.0 | 6/100/0 | 33.0 | 3.6 | 1.1 |
| Com. Ex. IV-2*3 | Em-B | 1700 | 98 | 0 | PVAc | 10.0 | 8.8 | 8/100/0.8 | 35.0 | 5.1 | 1.5 |
| Com. Ex. IV-3 | Em-C | 1000 | 99 | 7 | PVAc | 66.7 | 25.0 | 15/100/10 | Film disintegration | | 0.8 |

*1 Amount of CNF with respect to 100 parts by mass of ethylene-vinyl alcohol copolymer (A)

*2 Total amount of ethylene-vinyl alcohol copolymer (A) and CNF with respect to 100 parts by mass of polymer (C)

*3 Polyvinyl alcohol containing no ethylene unit was used in place of ethylene-vinyl alcohol copolymer (A)

The aqueous emulsion containing no CNF (Comparative Example IV-1) was inferior in terms of heatproof adhesive properties and the water resistance of the coating, compared to the aqueous emulsion (Example IV-4) that had the CNF content falling within the range specified by the present disclosure. The coating disintegrated, and it was not possible to measure the water resistance of the coating in the aqueous emulsion (Comparative Example IV-3) in which the CNF content exceeded the range specified by the present disclosure. The aqueous emulsion of Comparative Example IV-3 also had poor heatproof adhesive properties. The aqueous emulsion (Comparative Example IV-2) using a polyvinyl alcohol containing no ethylene unit was inferior in terms of heatproof adhesive properties and the water resistance of the coating, compared to the aqueous emulsion (Example IV-1) using ethylene-vinyl alcohol copolymer (A). As demonstrated in Examples IV-1 to IV-5, the aqueous emulsions of the present disclosure showed superior heatproof adhesive properties, and the coatings had superior water resistance.

The invention claimed is:

1. An aqueous emulsion comprising an ethylene-vinyl alcohol copolymer (A) as a dispersant; a polymer (C) containing an ethylenically unsaturated monomer unit as a dispersoid;

and a cellulose nanofiber, the content of the cellulose nanofiber being 0.1 to 40 parts by mass with respect to 100 parts by mass of the ethylene-vinyl alcohol copolymer (A), and the total content of the ethylene-vinyl alcohol copolymer (A) and the cellulose nanofiber is 2 to 20 parts by mass with respect to 100 parts by mass of the polymer (C), wherein the aqueous emulsion excludes a cross-linking agent.

2. The aqueous emulsion according to claim 1, wherein the ethylene unit content of the ethylene-vinyl alcohol copolymer (A) is 1 mol % or more and less than 20 mol %.

3. The aqueous emulsion according to claim 1, wherein, the ethylene unit content of the ethylene-vinyl alcohol copolymer (A) is 1 mol % or more and less than 15 mol %.

4. The aqueous emulsion according to claim 3, wherein the ethylene-vinyl alcohol copolymer (A) has a viscosity-average degree of polymerization of 200 to 5,000.

5. The aqueous emulsion according to claim 3, wherein the ethylene-vinyl alcohol copolymer (A) has a degree of saponification of 80 to 99.9 mol %.

6. The aqueous emulsion according to claim 3, wherein the content of the cellulose nanofiber is 0.1 to 25 parts by mass with respect to 100 parts by mass of the ethylene-vinyl alcohol copolymer (A).

7. The aqueous emulsion according to claim 3, wherein the total content of the ethylene-vinyl alcohol copolymer (A) and the cellulose nanofiber in the aqueous emulsion is 0.1 to 30 mass %.

8. The aqueous emulsion according to claim 3, wherein the ethylene-vinyl alcohol copolymer (A) has a block character of the ethylene unit of 0.90 to 0.99.

9. The aqueous emulsion according to claim 1, wherein the total content of the ethylene-vinyl alcohol copolymer (A), the polymer (C), and the cellulose nanofiber in solids contained in the aqueous emulsion is 55 mass % or more.

10. The aqueous emulsion according to claim 1, wherein the polymer (C) comprises 70 mass % or more of a monomer unit derived from at least one selected from the group consisting of a vinyl ester monomer, a (meth)acrylic acid ester monomer, a styrene monomer, and a diene monomer, with respect to all monomer units.

11. A coating agent comprising an aqueous emulsion of claim 1.

12. The coating agent according to claim 11, which is a paper coating agent.

13. A coated paper comprising a paper, wherein the paper is coated with a paper coating agent of claim 12.

14. The coated paper according to claim 13, which is a release paper base or a greaseproof paper.

15. A multilayer structure comprising a substrate containing a resin, wherein the substrate is coated with the coating agent of claim 11.

16. The multilayer structure according to claim 15, wherein the resin is at least one selected from the group consisting of a polyolefin resin, a polyester resin, and a polyamide resin.

17. A packing material comprising a multilayer structure of claim 15.

18. An adhesive agent comprising an aqueous emulsion of claim 1.

19. A method for producing an aqueous emulsion of claim 1, comprising:

polymerizing an ethylenically unsaturated monomer that forms the polymer (C) by emulsion polymerization in the presence of the ethylene-vinyl alcohol copolymer (A) to obtain a cellulose nanofiber-free aqueous emulsion; and adding the cellulose nanofiber to the cellulose nanofiber-free aqueous emulsion to form the aqueous emulsion.

20. A method for producing the aqueous emulsion of claim 1, comprising:

obtaining an aqueous dispersion containing the ethylene-vinyl alcohol copolymer (A) and the cellulose nanofiber; and mixing the aqueous dispersion with an ethylenically unsaturated monomer that forms the polymer (C) to allow emulsion polymerization to form the aqueous emulsion.

* * * * *